US010569729B2

(12) United States Patent
Munjurulimana et al.

(10) Patent No.: US 10,569,729 B2
(45) Date of Patent: Feb. 25, 2020

(54) ENERGY ABSORPTION MEMBER FOR AUTOMOBILE

(71) Applicant: SABIC Global Technologies B.V., Bergen op Zoom (NL)

(72) Inventors: Dinesh Munjurulimana, Bangalore (IN); Arunachala Parameshwara, Bangalore (IN); Venkatesha Narayanaswamy, Bangalore (IN); Dhanendra Nagwanshi, Farmington Hills, MI (US); Matthew Michael Delaney, Belleville, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/570,736

(22) PCT Filed: Apr. 27, 2016

(86) PCT No.: PCT/US2016/029547
§ 371 (c)(1),
(2) Date: Oct. 30, 2017

(87) PCT Pub. No.: WO2016/176319
PCT Pub. Date: Nov. 3, 2016

(65) Prior Publication Data
US 2018/0290611 A1 Oct. 11, 2018

(30) Foreign Application Priority Data
Apr. 30, 2015 (IN) .......................... 1205/DEL/2015

(51) Int. Cl.
*B60R 19/34* (2006.01)
*F16F 7/12* (2006.01)
(Continued)

(52) U.S. Cl.
CPC .............. *B60R 19/34* (2013.01); *B62D 65/16* (2013.01); *F16F 7/003* (2013.01); *F16F 7/121* (2013.01)

(58) Field of Classification Search
CPC .......... B60R 19/34; B62D 65/16; F16F 7/121; F16F 7/003
See application file for complete search history.

(56) References Cited

U.S. PATENT DOCUMENTS

| D305,323 S | 1/1990 | Anderson et al. |
| 4,934,721 A | 6/1990 | Flores |
(Continued)

FOREIGN PATENT DOCUMENTS

| EP | 1001091 A2 | 5/2000 |
| EP | 1197398 A2 | 4/2002 |
(Continued)

*Primary Examiner* — D Glenn Dayoan
*Assistant Examiner* — Melissa Ann Bonifazi
(74) *Attorney, Agent, or Firm* — BakerHostetler

(57) ABSTRACT

A plastic energy absorption member (28) for an automobile bumper assembly (22) is disclosed. The plastic energy absorption member (28) includes a plastic crushable body (34) defining a first end and a second end opposite the first end along a length of the crushable body (34). The plastic energy absorption member (28) further includes a plastic first mounting portion (30) disposed proximate to the first end and monolithic with the plastic crushable body (34), the first mounting portion defining at least one first attachment member (38) configured to attach to the bumper (24), and a plastic second mounting portion (32) disposed proximate to the second end and monolithic with the plastic crushable body (34), the second mounting portion defining at least one second attachment member (42) configured to attach to the automobile rail (26). The energy absorption member (28) defines a plurality of voids (44) that each extend along at least a portion of the length of the crushable body (34).

18 Claims, 13 Drawing Sheets

(51) Int. Cl.
*F16F 7/00* (2006.01)
*B62D 65/16* (2006.01)

(56) References Cited

U.S. PATENT DOCUMENTS

| | | | |
|---|---|---|---|
| D318,039 S | 7/1991 | Flores | |
| D324,668 S | 3/1992 | Anderson | |
| 5,382,035 A | 1/1995 | Waddington et al. | |
| 5,636,866 A | 6/1997 | Suzuki et al. | |
| D476,927 S | 7/2003 | Delgado | |
| 6,938,936 B2 | 9/2005 | Mooijman et al. | |
| 7,044,515 B2 | 5/2006 | Mooijman et al. | |
| D567,729 S | 4/2008 | Crandall | |
| 7,694,787 B2 | 4/2010 | Kano et al. | |
| D618,148 S | 6/2010 | Hoppert | |
| 8,136,826 B2 | 3/2012 | Watson | |
| 8,459,726 B2 | 6/2013 | Tyan et al. | |
| 8,714,575 B2 | 5/2014 | Watson | |
| 8,757,687 B2 | 6/2014 | Kaneko et al. | |
| 8,844,986 B2 | 9/2014 | Kaneko et al. | |
| D718,195 S | 11/2014 | Hayes | |
| D746,187 S | 12/2015 | Park et al. | |
| 2003/0160418 A1 | 8/2003 | Farkash | |
| 2004/0084820 A1 | 5/2004 | Kato et al. | |
| 2006/0043744 A1 | 3/2006 | Iketo et al. | |
| 2011/0015902 A1 | 1/2011 | Cheng et al. | |
| 2011/0291431 A1 | 12/2011 | Buschsieweke et al. | |
| 2012/0104719 A1 | 5/2012 | Hayes | |
| 2012/0104778 A1 | 5/2012 | Mana et al. | |
| 2013/0001963 A1 | 1/2013 | Haneda et al. | |
| 2013/0175813 A1 | 7/2013 | Mana et al. | |
| 2013/0193699 A1 | 8/2013 | Zannier | |
| 2015/0069774 A1 | 3/2015 | Mukainakano et al. | |

FOREIGN PATENT DOCUMENTS

| | | |
|---|---|---|
| EP | 1894791 A2 | 3/2008 |
| EP | 2406109 B1 | 12/2014 |
| FR | 2761434 A1 | 10/1998 |
| JP | 2001-239834 A | 9/2001 |
| WO | 2014113580 A1 | 7/2014 |

10 ms 25 ms 50 ms 70 ms

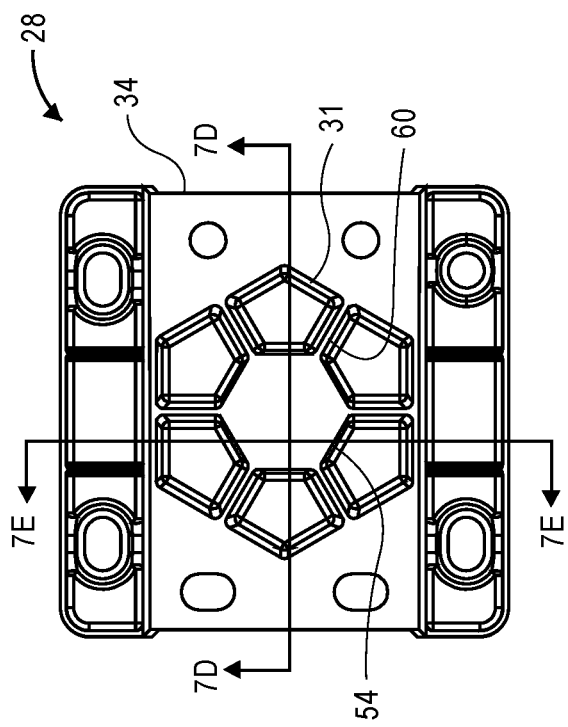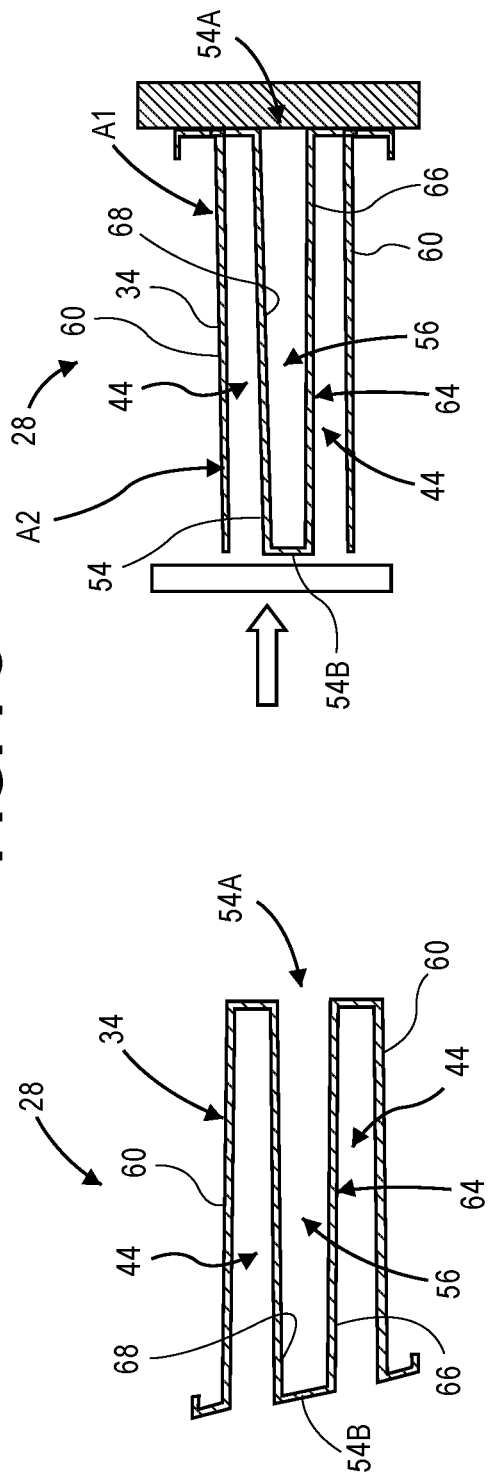

ENERGY ABSORPTION MEMBER FOR AUTOMOBILE

CROSS-REFERENCE TO RELATED APPLICATIONS

This application is the National Stage of International Application No. PCT/US2016/029547, filed Apr. 27, 2016, which claims the benefit of Indian Provisional Application No. 1205/DEL/2015, filed Apr. 30, 2015, the disclosures of which are incorporated herein by reference in their entireties.

CROSS REFERENCE TO PRIOR APPLICATIONS

This application claims priority to Indian patent application No. 1205/DEL/2015, filed on Apr. 30, 2015, the disclosure of which is incorporated by reference in its entirety.

BACKGROUND

Conventional automobiles include front and rear rails that are supported by a chassis, and front and rear bumpers that are in turn supported by front and rear rails. When an automobile is in a front-end or rear-end collision, energy is received by the respective bumper. In order to reduce the collision energy that is transferred from the bumper to the rail, automobiles often include metallic energy absorption members that are attached to the respective rail and the bumper. The energy absorption members are configured to collapse in response to the collision energy. As the energy absorption members collapse, they absorb energy that would otherwise be transferred to the rail.

One type of conventional energy absorption member is typically made of a metal, such as steel or aluminum, in three or four separate parts that are attached to each other. What is desired is an improved energy absorption member.

SUMMARY

The following Summary is provided to introduce a selection of concepts in a simplified form that are further described below in the Detailed Description. This Summary is not intended to identify key features or essential features of the invention, nor is it intended to be used to limit the scope of the invention. Reference is made to the claims for that purpose.

The present inventors have recognized that conventional multi-piece energy absorption members include several parts that renders the assembly process complex. An aspect of the present disclosure helps to provide a solution to this problem, for instance with an energy absorption member that includes a crushable body, a first mounting portion that is monolithic with the crushable body and configured to mount to an automobile bumper, and a second mounting portion that is monolithic with the crushable body and configured to mount to an automobile rail. The monolithic energy absorption member can fit within the same footprint as conventional multi-piece energy absorption members. In one aspect of the present disclosure, the monolithic energy absorption member can maintain the same locations of the attachment members as conventional multi-piece metallic energy absorption members, wherein the attachment members are configured to attach to a respective one of an automobile rail and a bumper.

The present inventors have also recognized that conventional metallic energy absorption members are unnecessarily heavy, particularly given that a prevalent design consideration in automobiles is to make the automobile lightweight. An aspect of the present disclosure helps to provide a solution to this problem, for instance with a plastic energy absorption member that weighs less than conventional metallic energy absorption members.

The present inventors have also recognized that conventional energy absorption members suffer from unreliable collapsing characteristics in response to a collision impact. An aspect of the present disclosure helps to provide a solution to this problem, for instance with an energy absorption member having a crushable body, and mounting portions that are isolated from the crushable body during operation, such that collapsing of the crushable body does not, on its own, compromise the attachment of the energy absorption member to the automobile rail or bumper. In an aspect of the present disclosure helps to provide a solution to this problem, for instance by increasing the strength or stiffness, or both, of the crushable body in a direction from the first mounting portion that attaches to the bumper to the second mounting portion that attaches to the automobile rail. In an aspect of the present disclosure helps to provide a solution to this problem, for instance by defining a geometry of the crushable body that increases the lateral stability of the crushable body during instances of oblique impact.

In one aspect, an energy absorption member configured to be coupled between an automobile rail and a bumper includes a plastic crushable body defining a first end and a second end opposite the first end along a length of the crushable body; a plastic first mounting portion disposed proximate to the first end and monolithic with the plastic crushable body, the first mounting portion defining at least one first attachment member configured to attach to the bumper; and a plastic second mounting portion disposed proximate to the second end and monolithic with the plastic crushable body, the second mounting portion defining at least one second attachment member configured to attach to the automobile rail, wherein the energy absorption member defines a plurality of voids that each extend along at least a portion of the length of the crushable body.

BRIEF DESCRIPTION OF THE DRAWINGS

The foregoing summary, as well as the following detailed description, is better understood when read in conjunction with the appended drawings. There is shown in the drawings example aspects. The present invention is not intended to be limited to the specific aspects and methods disclosed, and reference is made to the claims for that purpose.

FIG. 4B is a side elevation view of the energy absorption member illustrated in FIG. 4A, shown at a second time during the impact, wherein the second time is after the first time;

FIG. 7C is a front elevation view of the energy absorption member illustrated in FIG. 7A;

FIG. 7D is a sectional elevation view of the energy absorption member illustrated in FIG. 7C, taken along line 7D-7D;

FIG. 7E is a sectional elevation view of the energy absorption member illustrated in FIG. 7C, taken along line 7E-7E;

DETAILED DESCRIPTION

Figure 1:
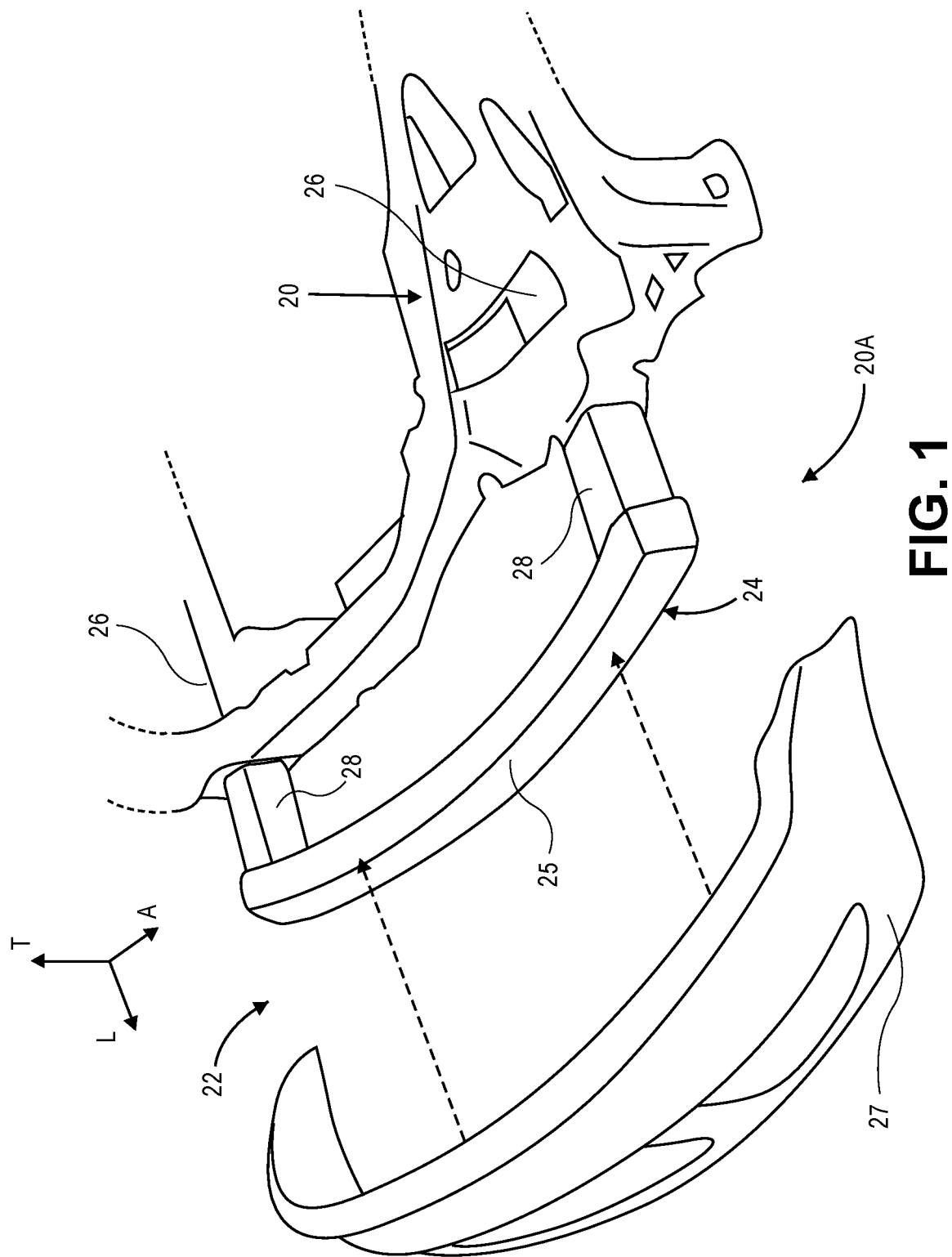
FIG. 1 is an exploded perspective view of a front end of a frame, including a bumper assembly that, in turn, includes a pair of rails, a bumper, and a plurality of energy absorption members configured to be coupled between the bumper and a respective one of the rails.

Referring to FIG. 1, an automobile 20 includes a bumper assembly 22 that is configured to absorb energy during a collision. The bumper assembly 22 can be disposed at a front end 20a of the automobile 20 so as to absorb energy during a front end collision. Alternatively or additionally, the bumper assembly 22 can be disposed at a rear of the automobile 20 so as to absorb energy during a rear end collision. The bumper assembly 22 can include a bumper 24, at least one automobile rail 26 such as a plurality of automobile rails 26 (e.g., a pair of automobile rails 26), and at least one energy absorption member 28, such as a plurality of energy absorption members (e.g., a pair of energy absorption members 28), coupled between the bumper 24 and a respective automobile rail 26. The bumper 24 can include a bumper rail 25 and a bumper fascia 27 that attaches to the bumper rail 25. The bumper assembly 22 can include a first energy absorption member 28 that is coupled between a first automobile rail 26 and the bumper 24, and a second energy absorption member 28 that is coupled between a second automobile rail 26 and the bumper 24. Each energy absorption member 28 can include a first mounting portion 30 that is configured to attach to the bumper 24, and in particular to the bumper rail 25, and a second mounting portion 32 that is configured to attach to the respective automobile rail 26.

The energy absorption member 28 includes a crushable body 34 that extends between the first mounting portion 30 and the second mounting portion 32. During a collision, impact energy from the collision that act on the bumper 24 are transferred to the crushable body 34. The crushable body 34 is configured to collapse along its length, thereby absorbing energy from the collision and isolating the absorbed energy from the respective automobile rail 26. It has been found that when the automobile suffers a collision at up to approximately 16 kilometers per hour (approximately 9.9 miles/hour) (km/h), the energy absorbent members 28 can be replaced, while the respective automobile rail 26 can be preserved. During a higher speed collision, the energy absorbent members 28 assist reducing the amount of energy that is absorbed by the respective automobile rail 26 and other structural members of the automobile 20. Otherwise stated, the absorption of energy by the crushable body 34 prevents the absorbed energy from being transferred to the respective automobile rail 26, thereby reducing or altogether preventing damage to the automobile frame.

The crushable body 34, the first mounting portion 30, and the second mounting portion 32 can all be made from a plastic. Thus, the energy absorption member 28 can weigh less than conventional multi-piece metallic energy absorption members while maintaining the same outer dimensions as conventional multi-piece metallic energy absorption members. In particular, the energy absorption member 28 can weigh less than conventional multi-piece metallic energy absorption members while maintaining the same locations of the attachment members as conventional multi-piece metallic energy absorption members, wherein the attachment members are configured to attach to a respective one of an automobile rail and a bumper. For instance, the energy absorption member 28 can be approximately 35% lighter compared to the conventional metallic energy absorption members. In one example, the energy absorption member can weigh less than 1.25 kilograms (2.76 pounds), for instance less than 1 kilogram (2.2 pounds). In one example, the crushable body 34, the first mounting portion 30, and the second mounting portion 32 can define a single unitary monolithic structure. It is recognized that while some automobile collisions occur in a direction substantially normal to the bumper 24, many other automobile collisions occur at an angle that is oblique with respect to a direction substantially normal to the bumper. While conventional crushable bodys are configured to collapse during a front-end or rear-end collision, conventional crushable bodys have been found to be deficient at absorbing energy when the collision impact is along a direction oblique to the direction substantially normal to the bumper. As will be appreciated from the description below, the crushable body 34 defines a geometry that allows the energy absorption member 28 to absorb more energy than conventional crushable bodys when the automobile undergoes a collision impact to the bumper 24 along a direction that is oblique to a direction that is substantially normal to the bumper 24. For instance the crushable body 34 can define an elongate honeycomb structure 31.

FIGS. 1-2C and 6A-9B show the energy absorption member 28 configured to be coupled between the respective automobile rail 26 and the bumper 24 described above. The energy absorption member 28 can include the crushable body 34. As described above, the crushable body 34 can be a plastic crushable body. The crushable body can be made from any suitable plastic as desired. In one example, the plastic can be a blend of polyphenylene ether and polyamide. The blend of polyphenylene ether and polyamide can be configured as NORYL™ GTS™ Resin, commercially available from SABIC, having a principal place of business in Saudi Arabia. It should be appreciated, of course, that the plastic can alternatively or additionally be made from polybutylene terephthalate (PBT), acrylonitrile-butadiene-styrene (ABS), polycarbonate, polycarbonate/PBT blends, polycarbonate/ABS blends, copolycarbonate-polyesters, acrylic-styrene-acrylonitrile (ASA), acrylonitrile-(ethylene-polypropylene diamine modified)-styrene (AES), phenylene ether resins, blends of polyphenylene ether/polyamide, polyamides, phenylene sulfide resins, polyvinyl chloride (PVC), high impact polystyrene (HIPS), low/high density polyethylene (L/HDPE), polypropylene (PP), expanded polypropylene (EPP), thermoplastic olefins (TPO), and others. Any of the above plastic materials can be combined with glass fibers to define composite materials. Additionally or alternatively, any of the above plastic materials can be combined with carbon fibers to define composite materials.

The crushable body 34 can define a first end 34a and a second end 34b that is opposite the first end 34a along a longitudinal direction L. The crushable body 34 can define a length from the first end 34a to the second end 34b. For instance, the first and second ends 34a and 34b can be spaced from each other along a central axis 35 of the crushable body 34 that is oriented along the longitudinal direction L. The energy absorption member 28 can extend along a lateral direction A that is perpendicular to the longitudinal direction L, and a transverse direction T that is perpendicular to each of the longitudinal direction L and the lateral direction A. As used herein the term "radial" and derivatives thereof can be made with respect to a direction that includes one or more of the transverse direction T, the lateral direction A, and combinations thereof. The honeycomb structure 31 can be defined along a plane that is normal to the longitudinal direction L. Thus, the plane can be defined by the lateral direction A and the transverse direction T. The honeycomb structure 31 can be elongate along the longitudinal direction L at least between the first end 34a and the second ends 34b. For instance, the honeycomb structure 31 can be elongate from at least one of the first and second ends 34a and 34b toward the other of the first and second ends 34a and 34b. In one example, the honeycomb structure 31 can extend from the first end 34a to the second end 34b.

The first end 34a can be configured to be mounted to the bumper 24, and in particular the bumper rail 25, and the second end 34b can be configured to be mounted to the automobile rail 26. The first end 34a and the second end 34b can be oriented parallel to each other. For instance, both the first end 34a and the second end can extend along respective planes defined by the transverse direction T and the lateral direction A. Alternatively, the plane defined by one of the first and second ends 34a and 34b can be angled with respect to the plane defined by the other of the first and second ends 34a and 34b. For instance, the first end 34a can be tapered as it extends from one side wall 78 of the crushable body 34 to the other side wall 78 of the crushable body 34, wherein the side walls 78 are spaced from each other along the lateral direction A. The first mounting portion 30 can be disposed proximate to the first end 34a of the crushable body 34, for instance at the first end 34a. The first mounting portion 30 can be made from a plastic, which can be the same plastic as the crushable body 34. For instance, the first mounting portion 30 can be monolithic with the crushable body 34. The first mounting portion 30 defines at least one first attachment member 38 that is configured to attach to the bumper 24, and in particular the bumper rail 25. Similarly, the second mounting portion 32 can be disposed proximate to the second end 34b of the crushable body 34, for instance at the second end 34b. The second mounting portion 32 can be made from a plastic, which can be the same plastic as the crushable body 34. For instance, the second mounting portion 32 can be monolithic with the crushable body 34 and the first mounting portion 30. The second mounting portion 32 defines at least one second attachment member 42 that is configured to attach to the automobile rail 26. In one example, the crushable body 34, the first mounting portion 30, and the second mounting portion 32 can be injection molded as one monolithic apparatus. It should be appreciated, of course, that crushable body 34, the first mounting portion 30, and the second mounting portion 32 can be manufactured in any alternative manner as desired. Because the crushable body 34, the first mounting portion 30, and the second mounting portion 32 are monolithic with each other in one example, the first and second mounting portions 30 and 32 do not require separate attachment to the crushable body 34 as in conventional metallic energy absorbent members.

When the automobile rail 26 is a front rail disposed at the front end of the automobile, and the bumper 24 is a front bumper disposed at the front end of the automobile, the first end 34a can be referred to as a front end, and the second end 34b can be referred to as a rear end. When the automobile rail 26 is a rear rail disposed at the rear end of the automobile, and the bumper 24 is a rear bumper disposed at the rear end of the automobile, the first end 34a can be referred to as a rear end, and the second end 34b can be referred to as a front end.

As described above, the crushable body 34 can be a geometry that allows the energy absorption member 28 to absorb more energy than conventional crushable bodys when the automobile undergoes a collision impact to the bumper 24 along a direction that is oblique to a direction that is substantially normal to the bumper 24. For instance, the crushable body 34, and thus the energy absorption member 28, can define a plurality of voids 44 that each extend between the first and second ends 34a and 34b. The voids 44 can be oriented along the longitudinal direction L. In one example, at least one or more up to all of the voids 44 can extend from one of the first and second ends 34a and 34b toward the other of the first and second ends 34a and 34b. In another example, at least one or more up to all of the voids 44 can be contained between the first end 34a and the second end 34b, such that the voids 44 do not extend to the first end 34a, and further do not extend to the second end 34b. Accordingly, both ends of the voids 44 can be closed to the first end 34a and the second end 34b, respectively. It should be appreciated that the voids 44 can be continuous or discontinuous along their respective lengths. Thus, it should be appreciated that the voids 44 can extend along at least a portion of the length of the crushable body 34.

The at least one first attachment member 38 can be configured in any manner as desired suitable to attach the crushable body 34, and thus the energy absorption member 28, to the bumper 24, and in particular to the bumper rail 25. In one example, the at least one first attachment member 38 can be configured as at least one first mounting aperture 46, such as a plurality of mounting apertures 46. The energy absorption member 28 can be constructed such that the at least one first attachment member 38 does not form part of the crushable body 34. Thus, the attachment of the energy absorption member 28 to the bumper 24 is not likely to be affected by an impact that causes the crushable body 34 to collapse. The at least one first attachment member 38 can be configured so as to not meaningfully affect the crush performance of the crushable body 34 during the collision impact.

The energy absorption member 28 can include an insert 37 that is at least partially disposed in each first mounting aperture 46. In one example, the insert 37 can be configured as a washer 39. Alternatively or additionally, the insert 37 can be configured as a threaded nut 41. The insert 37 can be metallic, or can comprise any suitable material as desired. The first mounting portion 30 can be configured as a mounting plate 48. The mounting plate 48 can be disposed proximate to the first end 34a of the crushable body 34, for instance at the first end 34a. The mounting plate 48 can be monolithic with the crushable body 34. The mounting plate 48 can thus be made from plastic, and in particular the same plastic as the crushable body 34. The mounting plate 48 can be overmolded onto the inserts 37 such that a portion of the inserts 37 can extend into the respective ones of the first mounting apertures 46. In one example, at least a portion up to an entirety of the mounting plate 48 can be disposed at a location radially outward with respect to the plurality of voids 44. The inserts 37 can each be localized at the respective one of the mounting apertures 46, such that the inserts 37 do not extend into any other ones of the first mounting apertures 46. Alternatively, the inserts 37 can extend into more than one of the first mounting apertures 46, but not into other ones of the first mounting apertures 46.

The first mounting apertures 46 can extend at least into the mounting plate 48 in a direction from the first end 34a toward the second end 34b. Thus, the first mounting apertures 46 can extend along the longitudinal direction L. In one example, the first mounting apertures 46 can extend entirely through the mounting plate 48. The first mounting apertures 46 can be disposed radially outward with respect to the plurality of voids 44 that extend from at least one of the first and second ends 34a and 34b toward the other of the first and second ends 34a and 34b. As described above, the first mounting portion 30 may be configured to attach to the bumper 24, and in particular the bumper rail 25. For instance, the bumper assembly 22 can include at least one first fastener, such as a plurality of first fasteners, that are configured to attach the first mounting portion 30, and thus the energy absorption member 28, to the bumper 24. For instance, the first fasteners can extend at least into or through the bumper 24, and can extend at least into or through respective ones of the first mounting apertures 46. For instance, the first fasteners can be configured as threaded screws and/or threaded bolts. The heads of the first fasteners can abut respective ones of the washers 39 when the inserts 37 are configured as washers 39. Alternatively, the shafts of the first fasteners can threadedly purchase with respective ones of the threaded nuts 41 when the inserts 37 are configured as threaded nuts 41.

The at least one second attachment member 42 can be configured in any manner as desired suitable to attach the crushable body 34, and thus the energy absorption member 28, to the automobile rail 26. In one example, the at least one second attachment member 42 can be configured as at least one second mounting aperture 50, such as a plurality of second mounting apertures 50. The energy absorption member 28 can be constructed such that the at least one second attachment member 42 does not form part of the crushable body 34. Thus, the attachment of the energy absorption member 28 to the automobile rail 26 is not likely to be affected by an impact that causes the crushable body 34 to collapse. The at least one second attachment member 42 can be configured so as to not meaningfully affect the crush performance of the crushable body 34 during the collision impact.

The energy absorption member 28 can include an insert 37 that is at least partially disposed in each second mounting aperture 50. In one example, the insert 37 can be configured as a washer 39. Alternatively or additionally, the insert 37 can be configured as a threaded nut 41. The insert 37 can be metallic, or can include any suitable material as desired. The inserts 37 can each be localized at the respective one of the second mounting apertures 50, such that the inserts 37 do not extend into any other ones of the second mounting apertures 50. Alternatively, the inserts 37 can extend into more than one of the second mounting apertures 50 as described above, but not all of the second mounting apertures 50. The second mounting portion 32 can be configured as at least one mounting flange 52 that extends out from the crushable body 34. The second mounting apertures 50 can extend at least into the at least one mounting flange 52. In one example, the at least one mounting flange 52 can include a pair of mounting flanges 52. The at least one second mounting aperture 50 includes a first pair of second mounting apertures 50 that extends through a first one of the pair of mounting flanges 52, and a second pair of mounting apertures 50 that extends through a second one of the pair of mounting flanges 52. The mounting flanges 52 can extend from the crushable body 34 along the transverse direction T. Alternatively, the mounting flanges 52 can extend from the crushable body 34 along the lateral direction A. Alternatively still, the mounting flanges 52 can extend from the crushable body 34 along a direction that includes both the lateral direction A and the transverse direction T.

The mounting flanges 52 can be disposed proximate to the second end 34b of the crushable body 34, for instance at the second end 34b. The mounting flanges 52 can be monolithic with the crushable body 34. The mounting flanges 52 can thus be made from plastic, and in particular the same plastic as the crushable body 34. The mounting flanges 52 can be overmolded onto the inserts 37 such that a portion of the inserts 37 can extend into the respective ones of the second mounting apertures 50. In one example, at least a portion up to an entirety of the mounting flanges 52 can be disposed at a location radially outward with respect to the plurality of voids 44.

The second mounting apertures 50 can extend at least into the respective one of the mounting flanges 52 in a direction from the second end 34b toward the first end 34a. Thus, the second mounting apertures 50 can extend along the longitudinal direction L. In one example, the second mounting apertures 50 can extend entirely through the respective one of the mounting flanges 52. The second mounting apertures 50 can be disposed radially outward with respect to the plurality of voids 44 that extend from at least one of the first and second ends 34a and 34b toward the other of the first and second ends 34a and 34b. As described above, the second mounting portion 32 may be configured to attach to the automobile rail 26. For instance, the bumper assembly 22 can include at least one second fastener, such as a plurality of second fasteners, that are configured to attach the second mounting portion 32, and thus the energy absorption member 28, to the automobile rail 26. For instance, the second fasteners can extend at least into or through the automobile rail 26, and can extend at least into or through respective ones of the second mounting apertures 50. For instance, the second fasteners can be configured as threaded screws and/or threaded bolts. The heads of the second fasteners can abut respective ones of the washers 39 when the inserts 37 are configured as washers 39. Alternatively, the shafts of the fasteners can threadedly purchase with respective ones of the threaded nuts 41 when the inserts 37 are configured as threaded nuts 41.

The first mounting apertures 46 can be disposed outward with respect to the voids 44 along a first direction, and the second mounting apertures 50 can be disposed outward with respect to the voids 44 along a second direction that is perpendicular to the first direction. For instance, the first direction can be the lateral direction A, and the second direction can be the transverse direction T. Alternatively, the first direction can be the transverse direction T, and the second direction can be the lateral direction A. The bumper 24 and the automobile rail 26 can be elongate along the lateral direction A.

It be appreciated that a method can be provided for fabricating the bumper assembly 22. The method can include the steps of mounting the first end 34a of the crushable body 34 to the bumper 24. For instance, the mounting step can include the step of driving the first fasteners through respective at least one first attachment member 38 and at least into the bumper 24. For instance, the mounting step can include the step of abutting a portion of the first fasteners against the respective one of the inserts 37 as described above. Alternatively or additionally, the mounting step can include the step of threadedly purchasing a portion of the first fasteners with the respective one of the inserts 37. The method can include the step of mounting the second end 34b of the crushable body 34 to the automobile rail 26. For instance, the method can include the step of driving the at least one second fastener through the at least one second attachment member 42 and at least into the automobile rail 26. In one example, the second mounting step can include abutting a portion of the at least one second fastener against the insert 37. Alternatively or additionally, the second mounting step can include the step of threadedly purchasing a portion of the second fastener with the respective insert 37.

Referring to FIGS. 2A-2C and 6A-9B, the crushable body 34 can define a hub 54. As will be appreciated, the honeycomb structure 31 can include one or both of the hub 54 and the plurality of voids 44. The hub 54 can extend at least between the first and second ends 34a and 34b of the crushable body 34. For instance the hub 54 can extend from one of the first and second ends 34a and 34b toward the other of the first and second ends 34a and 34b. In one example, the hub 54 can extend from the first end 34a to the second end 34b.

As illustrated in FIGS. 2A-2C and 6A-8C, the hub 54 can define a void 56 that extends along at least a portion of the length of the crushable body 34. Thus, it can be said that the void 56 of the hub 54 can extend at least between the first and second ends 34a and 34b of the crushable body 34. For instance, the void 56 can extend from one of the first and second ends 34a and 34b toward the other of the first and second ends 34a and 34b. Thus, the hub 54 can define an open end 54a at one of the first and second ends 34a and 34b, and can define a closed end 54b at the other of the first and second ends 34a and 34b. The closed end 54b can at least partially or entirely close the hub 54, an in particular the void 56 of the hub 54. For instance, the closed end 54b can entirely close the hub 54, and in particular the void 56 of the hub, with respect to the longitudinal direction L. Alternatively, the hub 54 can include one or more voids that extend through the closed end 54b along the longitudinal direction L, such that the closed end 54b partially closes the hub 54, and in particular the void 56 of the hub 54, with respect to the longitudinal direction L. The closed end 54b of the hub 54 can be formed for the purposes of efficiency during injection molding of the energy absorption member 28. In one example, the void 56 of the hub can extend from the open end 54a at one of the first and second ends 34a and 34b at least halfway toward the other of the first and second ends 34a and 34b along the longitudinal direction L. In particular, the void 56 of the hub 54 can extend at least 75% of a distance from the first end 34a to the second end 34b along the longitudinal direction L. In one aspect, the void 56 of the hub 54 can extend 55% to 75% of a distance from the first end 34a to the second end 34b along the longitudinal direction L. In one aspect, the void 56 of the hub 54 can extend 65% to 75% of a distance from the first end 34a to the second end 34b along the longitudinal direction L. For instance, the void 56 of the hub 54 can extend at least 90% of a distance from the first end 34a to the second end 34b along the longitudinal direction L. In one aspect, the void 56 of the hub 54 can extend 70% to 90% of a distance from the first end 34a to the second end 34b along the longitudinal direction L. In one aspect, the void 56 of the hub 54 can extend 80% to 90% of a distance from the first end 34a to the second end 34b along the longitudinal direction L.

Figure 6A:
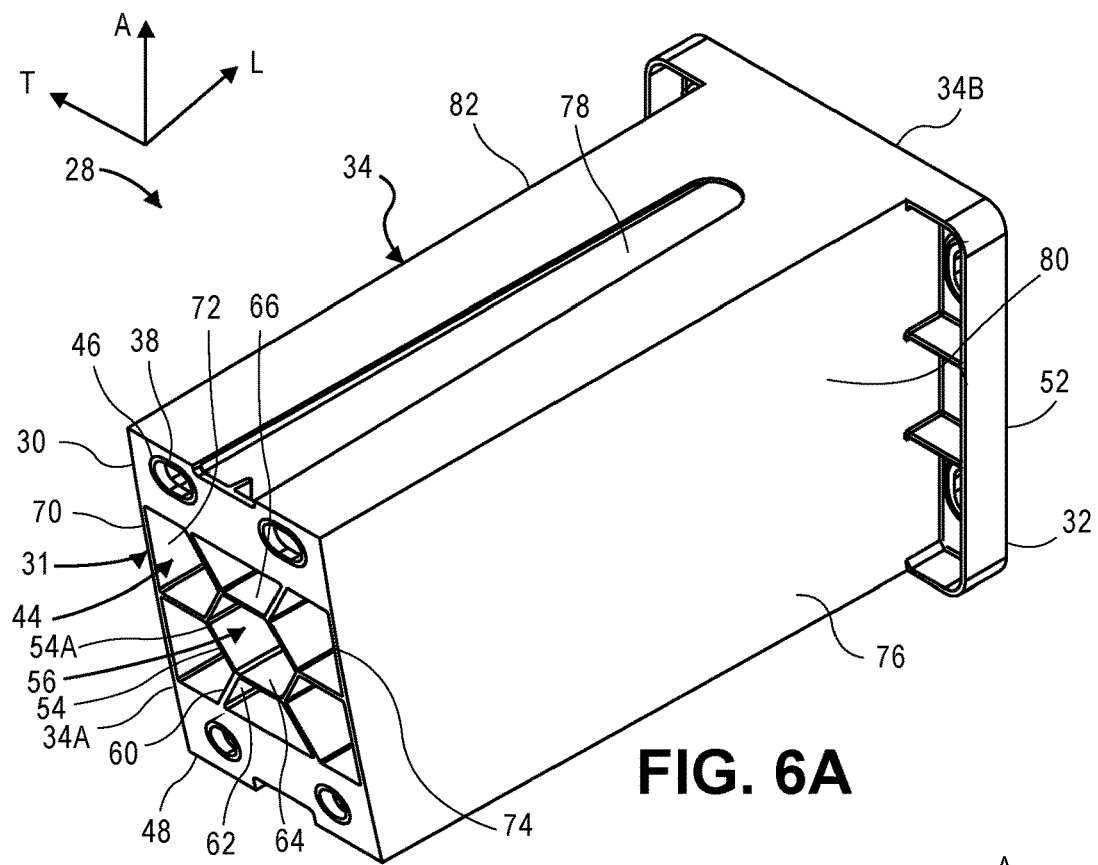
FIG. 6A is a front perspective view of an energy absorption member constructed in accordance with another aspect.
Figure 6B:
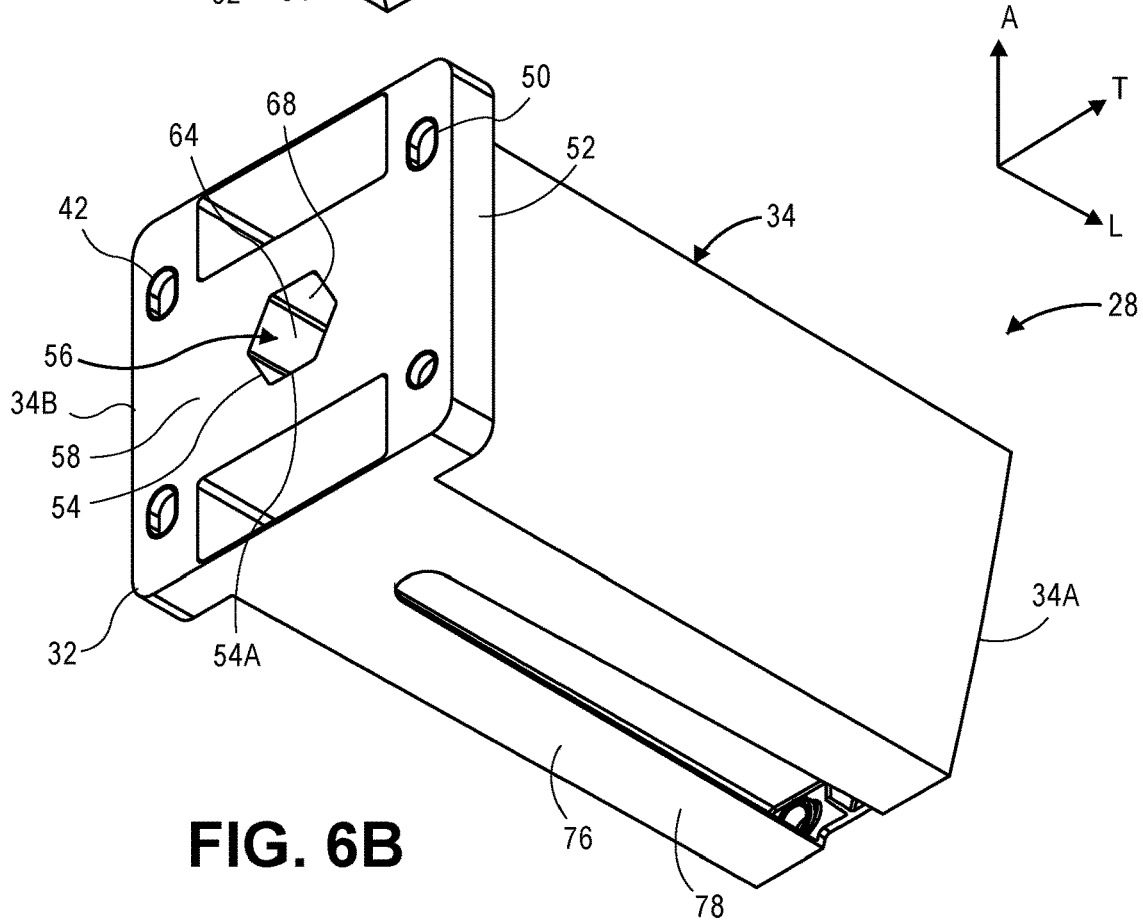
FIG. 6B is a rear perspective view of an energy absorption member illustrated in FIG. 6A.
Figure 6C:
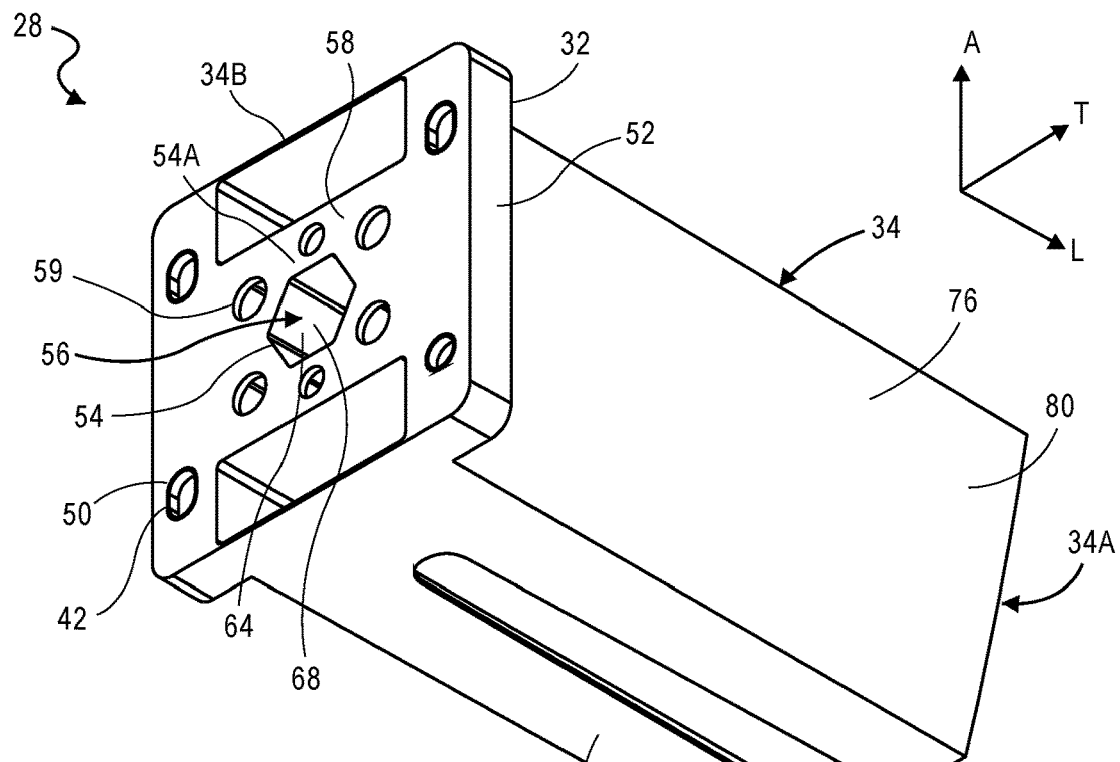
FIG. 6C is an alternative rear perspective view of an energy absorption member illustrated in FIG. 6A.
Figure 6D:
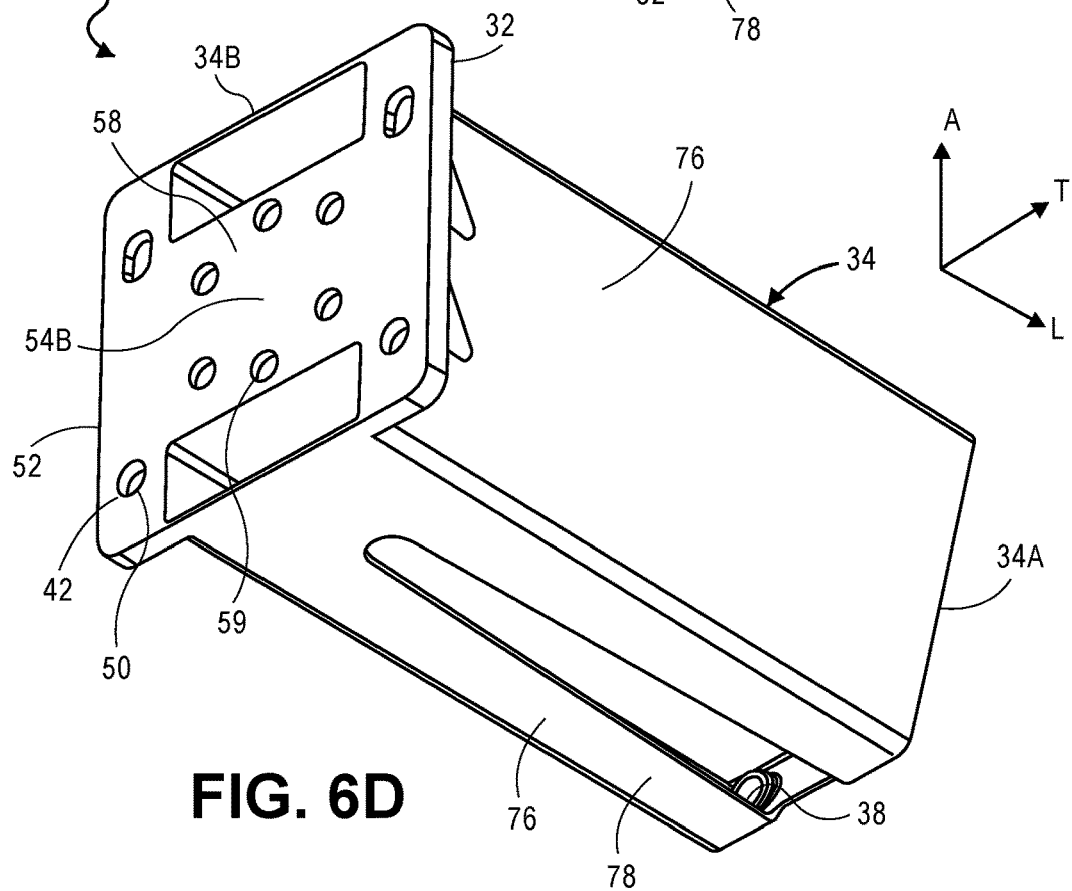
FIG. 6D is another alternative rear perspective view of an energy absorption member illustrated in FIG. 6A.
Figure 7A:
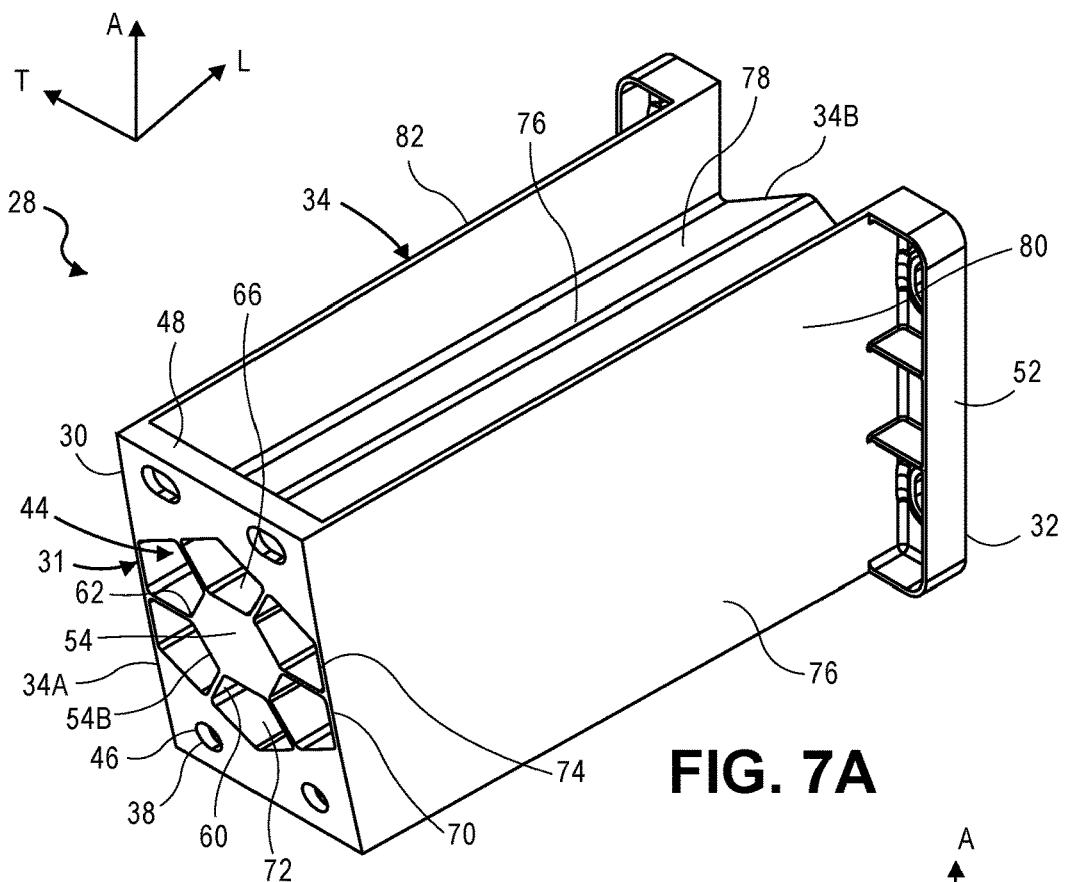
FIG. 7A is a front perspective view of an energy absorption member constructed in accordance with another aspect.
Figure 7B:
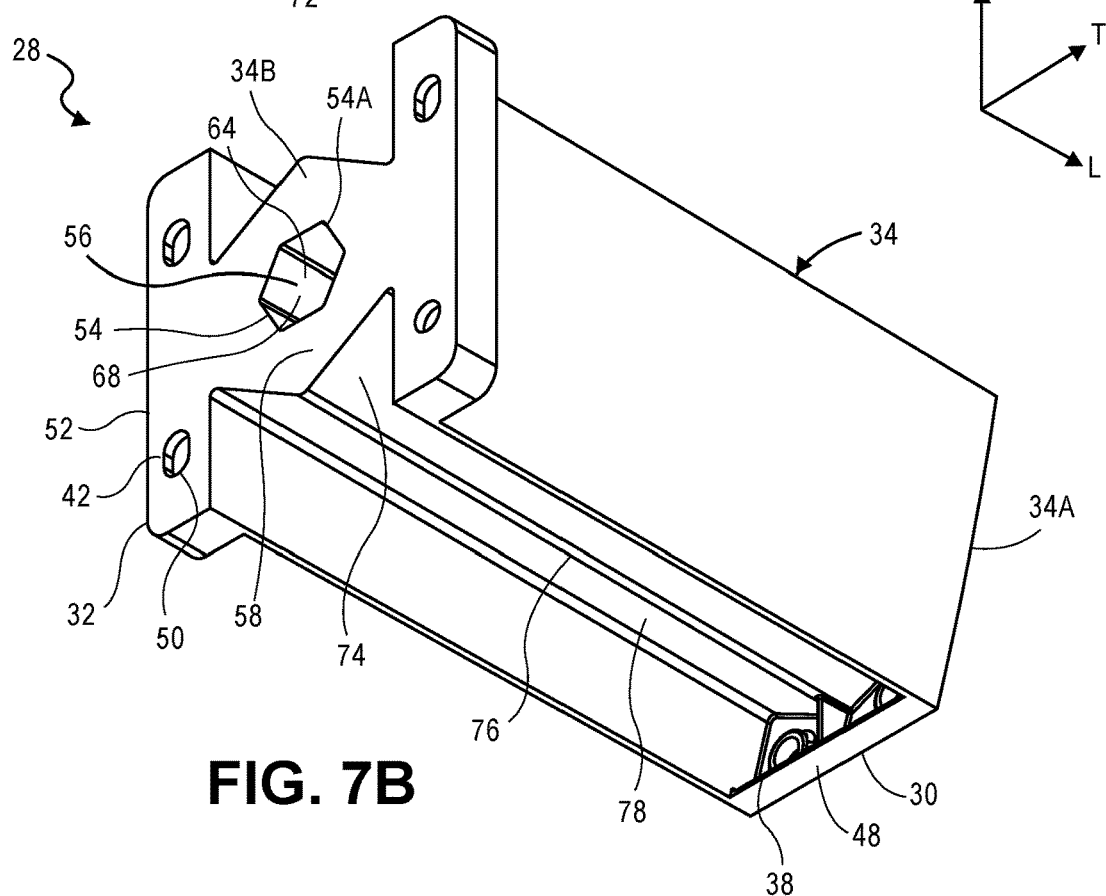
FIG. 7B is a rear perspective view of an energy absorption member illustrated in FIG. 7A.

As illustrated in FIGS. 2A-2B and 7A-7B, the closed end 54b of the hub 54 can be disposed at the first end 34a, and the open end 54a of the hub 54 can be disposed at the second end 34b. Thus, the void 56 can extend from the second end 34b toward the first end 34a, and can terminate in the crushable body 34 without extending through the first end 34a. Alternatively, as illustrated in FIGS. 6A and 6D and 8A-8C, the closed end 54b of the hub 54 can be disposed at the second end 34b, and the open end 54a of the hub 54 can be disposed at the first end 34a. Thus, the void 56 can extend from the first end 34a toward the second end 34b, and can terminate in the crushable body 34 without extending through the second end 34b. Alternatively still, as illustrated in FIGS. 6A-6C, the hub 54 can define open ends 54a both at the first end 34a and the second end 34b. Accordingly, the void 56 can extend from the first end 34a to the second end 34b. In another example, the void 56 of the hub 54 can be contained between the first end 34a and the second end 34b, such that the void 56 does not extend to the first end 34a, and further do not extend to the second end 34b. Accordingly, both ends of the void 56 can be closed to both the first end 34a and the second end 34b. It should be appreciated that the void 56 can be continuous or discontinuous along its length.

Referring to FIGS. 2A-2C and 6A-9B, the crushable body 34 can define at least one inner wall 64 that defines the hub 54. The at least one inner wall 64 can extend between the first end 34a and the second end 34b. For instance, the at least one inner wall 64 can extend from the first end 34a to the second end 34b. The at least one inner wall 64 can define a corresponding at least one outer surface 66. The at least one outer surface 66 can partially define the voids 44. For instance, the at least one outer surface 66 can define a radially inner boundary, or a radially inner end, of the voids 44.

As illustrated in FIGS. 2A-2C and 6A-8C, the at least one inner wall 64 can be annular so as to define the void 56 of the hub 54. In particular, the at least one inner wall 64 can similarly define at least one inner surface 68 that is opposite the at least one outer surface 66. The at least one inner surface 68 can define the void 56 of the hub 54. The at least one inner surface 68 can be oriented parallel to the at least one outer surface 66. Accordingly, the at least one outer surface 66 can define a geometry, and the at least one inner surface 68 can define the geometry that is defined by the at least one outer surface 66. The at least one inner surface 68 can extend from the open end 54a of the hub 54 to the closed end 54b. Similarly, the void 56 of the hub 54 defined by the at least one inner surfaces 68 can extend from the open end 54a to the closed end 54b.

Figure 8A:
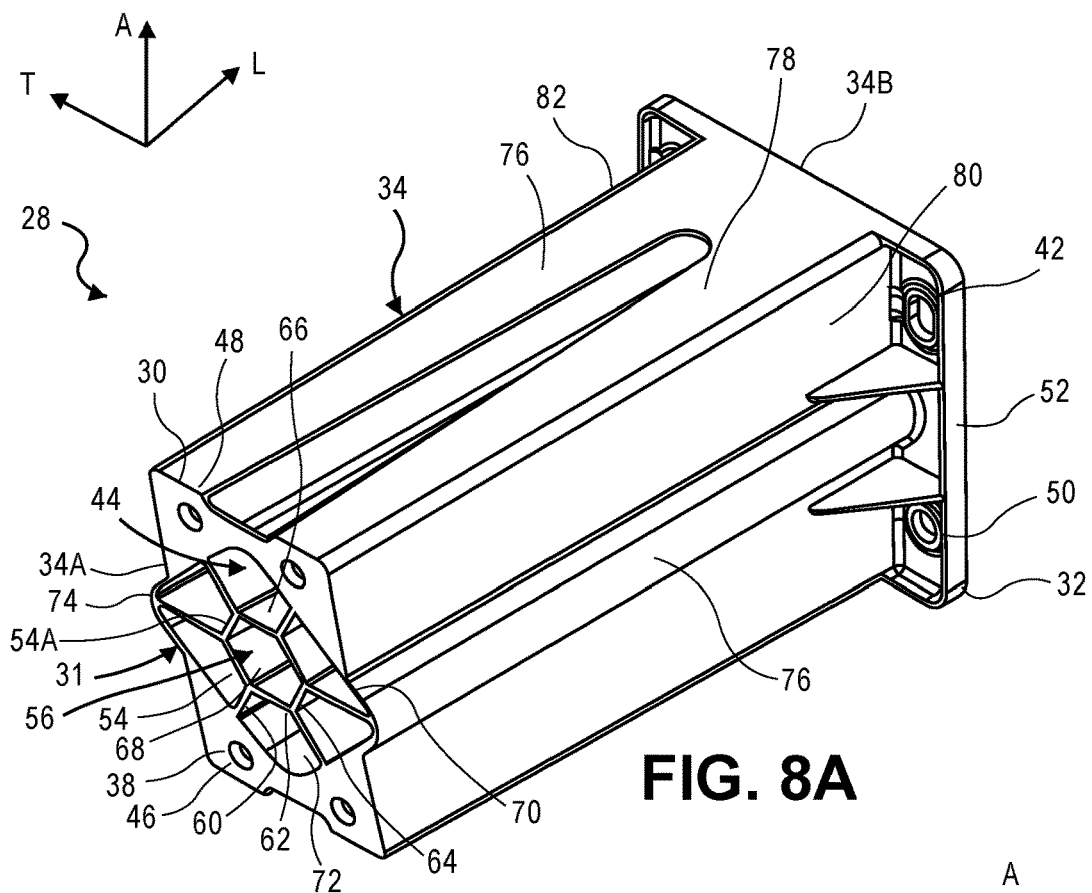
FIG. 8A is a front perspective view of an energy absorption member constructed in accordance with another aspect.
Figure 8B:
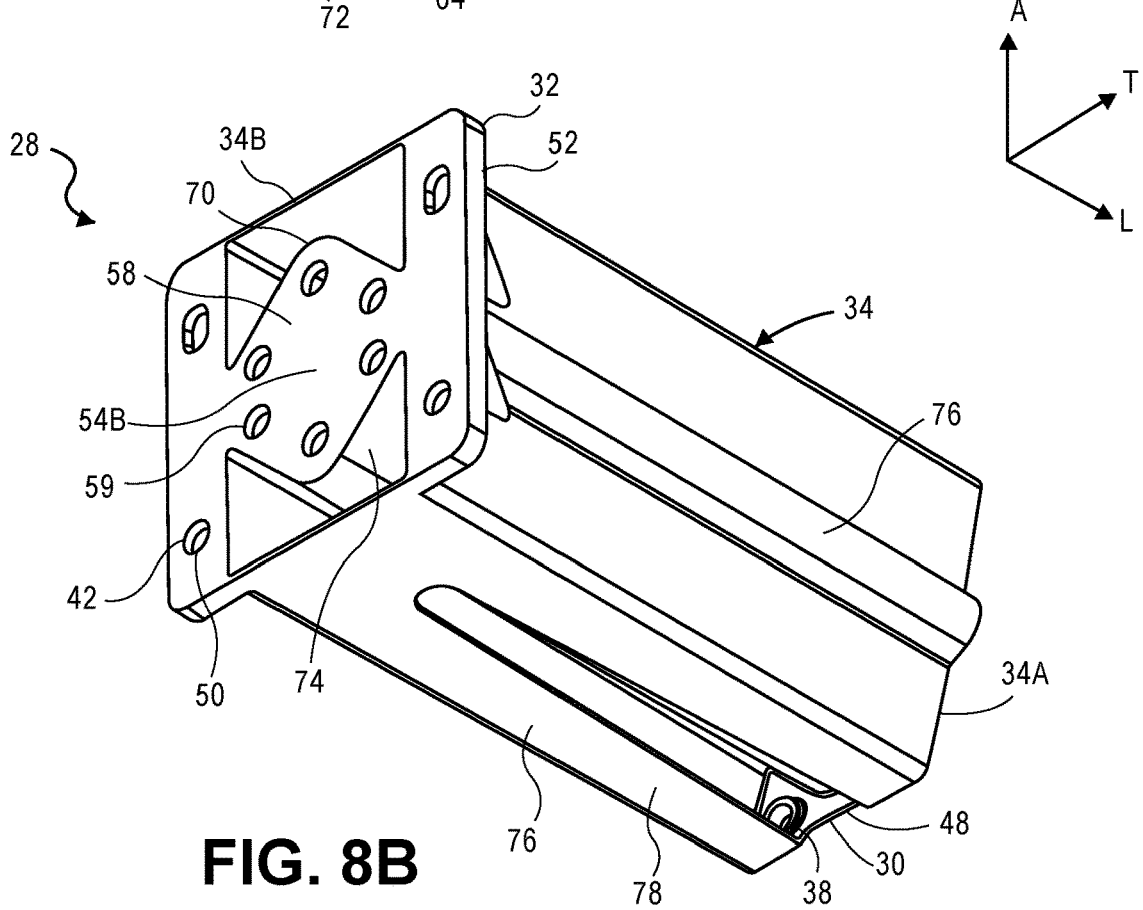
FIG. 8B is a rear perspective view of the energy absorption member illustrated in FIG. 8A.
Figure 8C:
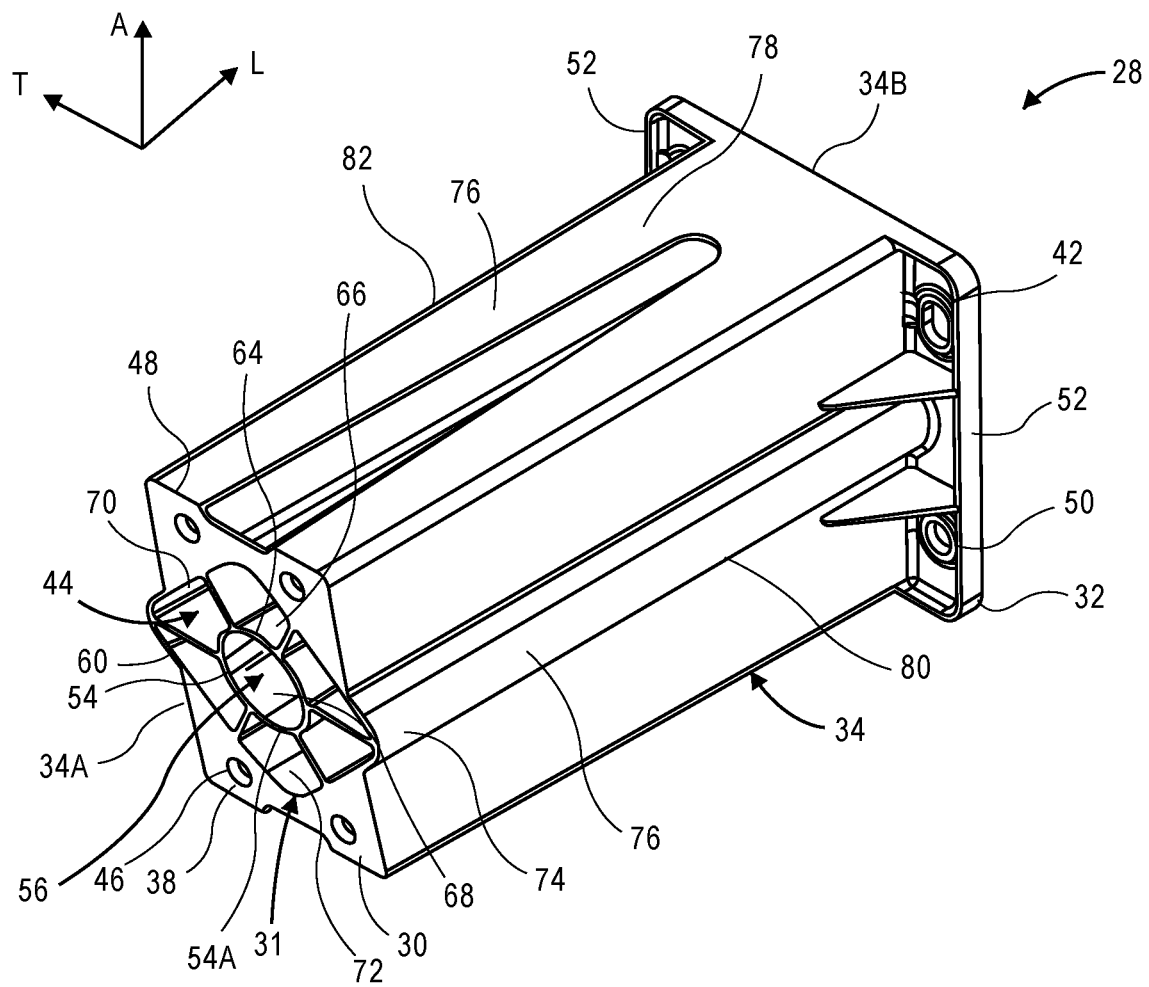
FIG. 8C is a front perspective view of an alternative energy absorption member similar to the energy absorption member illustrated in FIG. 8A, but shown defining a round void.

As illustrated in FIG. 8C, the at least one inner wall 64 can be configured as a continuous round wall that defines a rounded shape along a plane that is oriented normal to the longitudinal direction L. In one example, the rounded shape can be a circular shape along the plane. It should be appreciated, of course, that the inner wall 64 can define any suitable shape along the plane as desired. Thus, the outer surface 66 and the inner surface 68 of the inner wall 64 illustrated in FIG. 8C can each be configured as a continuous round surface having a rounded shape along the plane that is oriented normal to the longitudinal direction L. In one example, the rounded shape of the outer surface 66 and the inner surface 68 can be a circular shape. It should be appreciated, of course, that the outer surface 66 and the inner surface 68 can define any suitable shape along the plane as desired.

In another example, as illustrated in FIGS. 2A-2C and 6A-8A, the at least one inner wall 64 can be configured as a plurality of inner walls 64. The plurality of inner walls 64 can correspondingly define a respective plurality of outer surfaces 66. Each of the outer surfaces 66 can partially define at least a respective one of the voids 44. For instance, each of the outer surfaces 66 can partially define a respective one of the voids 44. In particular, each of the outer surfaces 66 can define a radially inner boundary, or a radially inner end, of a respective at least one of the voids 44. In one example, each of the outer surfaces 66 can define a radially inner boundary, or a radially inner end, of a respective one of the voids 44. The plurality of inner walls 64 can similarly define a plurality of inner surfaces 68 that are opposite a respective one of the outer surfaces 66. The inner surfaces 68 can combine to define the void 56 of the hub 54. The inner surfaces 68 can be oriented parallel to the opposed respective ones of the outer surfaces 66. Accordingly, the outer surfaces 66 can combine to define a geometry, and the inner surfaces 68 can combine to define the geometry that is defined by the outer surfaces 66. As illustrated in Figs. FIGS. 2A-2C and 6A-6B and 6D-8A, the inner surfaces 68 can extend from the open end 54a of the hub 54 to the closed end 54b. Alternatively, as illustrated in FIGS. 6A and 6C, the void 56 of the hub 54 defined by the inner surfaces 68 can extend from the open end 54a to the closed end 54b.

Referring to FIGS. 2A-2C and 6A-8A, the plurality of inner walls 64 can combine to define a geometry, such as a polygonal shape, along a plane that is oriented normal to the longitudinal direction L. The outer surfaces 66 can combine to define the polygonal shape along the plane that is disposed at any location from the open end 54a of the hub 54 to the closed end 54b of the hub 54. Thus, the outer surfaces 66 can combine to define the polygonal shape along the plane that is disposed at any location from the first end 34a to the second end 34b. It should thus be appreciated that the geometry of the hub 54, which can be defined by the inner walls 64, and in particular can be defined by the outer surfaces 66 of the inner walls 64, along the plane can define a plurality of apices 62. The inner surfaces 68 can combine to define the polygonal shape along the plane that is disposed at any location such that the plane extends through the void 56 of the hub 54. Along a plane that is oriented normal to the longitudinal direction L, the polygonal shape can be symmetrical about a central axis of the polygonal shape that extends in the transverse direction T and bisects the polygonal shape. The polygonal shape can be a regular polygonal shape. In one example, the polygonal shape can be configured as a hexagon. It should be appreciated, of course, that the polygonal shape can define any suitable alternative polygonal shape as desired. For instance, the polygonal shape may have any number of sides as desired. As another example, the polygonal shape can be an irregular polygonal shape.

Referring to FIGS. 2A-2C and 6A-9B, and as described above, the crushable body 34, and thus the energy absorption member 28, can define a plurality of voids 44 that each extend at least between the first end 34a and the second end 34b. For instance, at least one or more up to all of the voids 44 can extend from one of the first and second ends 34a and 34b at least toward the other of the first and second ends 34a and 34b. The voids 44 can be disposed radially outward with respect to the hub 54. For instance, at least some up to all of the plurality of voids 44 can extend from one of the first end second ends 34a and 34b toward the other of the first and second ends 34a and 34b without extending through the other of the first and second ends 34a and 34b in their respective entireties. Each of the plurality of voids 44 can extend along a majority of the length of the crushable body along the longitudinal direction L from the first end 34a to the second end 34b. In particular, each of the voids 44 can extend at least 75% of the distance from the first end 34a to the second end 34b along the longitudinal direction L. In one aspect, each of the voids 44 can extend 55% to 75% of the distance from the first end 34a to the second end 34b along the longitudinal direction L. In one aspect, each of the voids 44 can extend 65% to 75% of the distance from the first end 34a to the second end 34b along the longitudinal direction L. For instance, the voids 44 can extend at least 90% of a distance from the first end 34a to the second end 34b along the longitudinal direction L. In one aspect, the voids 44 can extend 70% to 90% of a distance from the first end 34a to the second end 34b along the longitudinal direction L. In one aspect, the voids 44 can extend 80% to 90% of a distance from the first end 34a to the second end 34b along the longitudinal direction L.

The voids 44 can be at least partially closed at the second end 34b and open at the first end 34a. Otherwise stated, each of the plurality of voids 44 can extend from the first end 34a toward the second end 34b, and can terminate in the crushable body 34 without extending through the second end 34b in their respective entireties. Alternatively, the voids 44 can be at least partially closed at the first end 34a and open at the second end 34b. Otherwise stated, each of the plurality of voids 44 can extend from the second end 34b toward the first end 34a, and can terminate in the crushable body 34 without extending through the first end 34a in their respective entireties.

For instance, the crushable body 34 can include an end plate 58 that at least partially closes the voids 44. The mounting flange 52 can extend radially out from the end plate 58. In one example, the mounting flange 52 can be coplanar with the end plate 58. In one example, the end plate 58 can be disposed proximate to the second end 34b, for instance at the second end 34b. Alternatively, the end plate 58 can be disposed proximate to the first end 34a, for instance at the first end 34a. As described above, closed end 54b of the void 56 of the hub 54 can be disposed proximate to one of the first and second ends 34a and 34b. As illustrated in FIGS. 2A-2B and 7A-7C, the end plate 58 can be disposed at the other of the first and second ends. Thus, the end plate 58 can define the open end 54a of the hub 54. Alternatively, as illustrated in FIGS. 6A and 6D and 8A-8C, the end plate 58 can at least partially or entirely close both at least some up to all of the voids 44. The end plate 58 can define the closed end 54b of the hub 54.

Referring to FIGS. 2A-2C, 6A-6B, 7A-7B, and 9A-9B, the end plate 58 can close an entirety of the voids 44. Alternatively, as illustrated in FIGS. 6A and 6D and 8A-8B, the crushable body 34 can define at least one hole by that extends through the end plate 58 at a location aligned with a respective one of the voids 44. Thus, the at least one hole at least one hole 59 can be open to the void 44. The at least one hole 59 can define a plurality of holes that extend through the end plate 58. Each of the holes 59 can be aligned with a respective one of the voids 44. Thus, each of the holes 59 can be open to a respective one of the voids 44. Thus, it is recognized that one or more up to all of the voids 44 can be entirely closed by the end plate 58, such that the void 44 in its entirety is closed by the end plate 58. Alternatively, or additionally, one or more up to all of the voids 44 can be partially closed by the end plate 58, such that the partially closed voids 44 do not extend through the end plate 58 in their respective entireties. Rather, a portion of the partially closed voids 44 can extend through at least one or more of the holes 59 that extend through the end plate 58. Alternatively still, each of the plurality of voids 44 can extend through the crushable body 34 from the first end 34a to the second end 34b along the longitudinal direction L in their entireties.

Figure 9A:
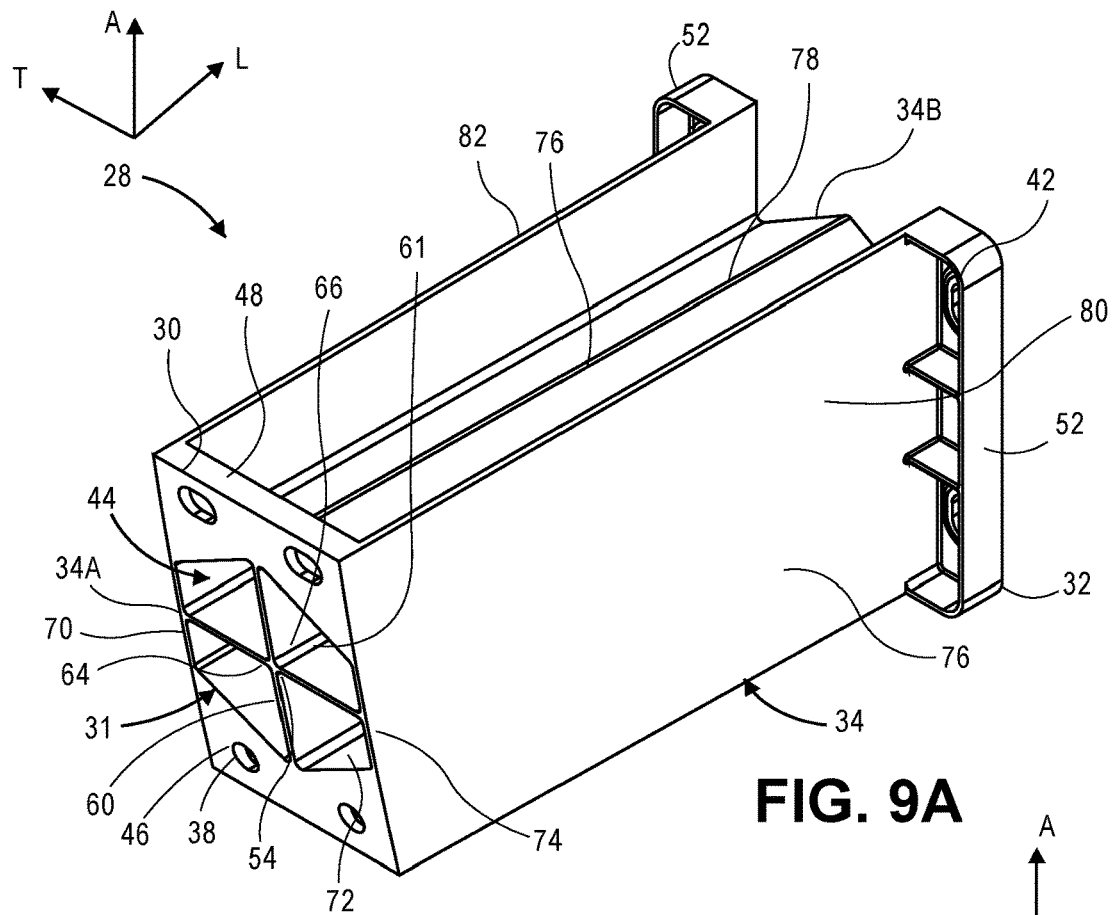
FIG. 9A is a front perspective view of an energy absorption member constructed in accordance with another aspect.
Figure 9B:
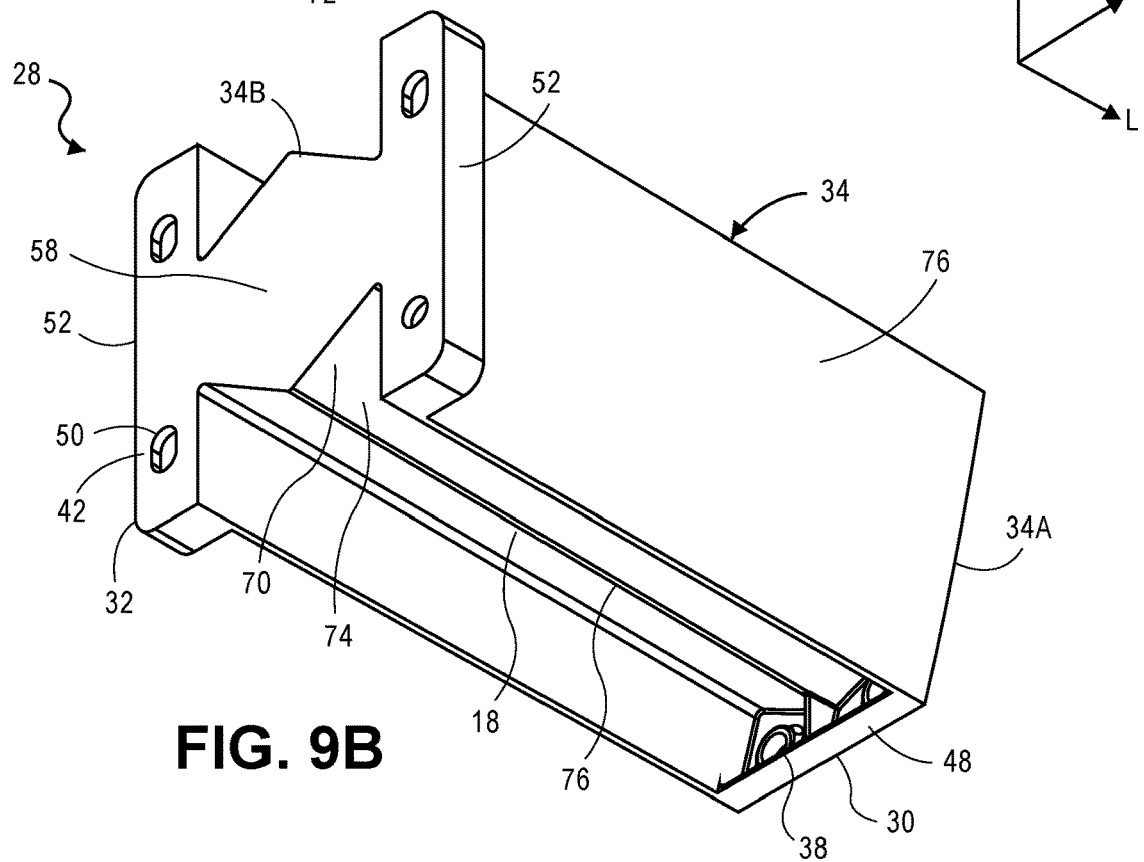
FIG. 9B is a rear perspective view of the energy absorption member illustrated in FIG. 9A.
Figure 10A:
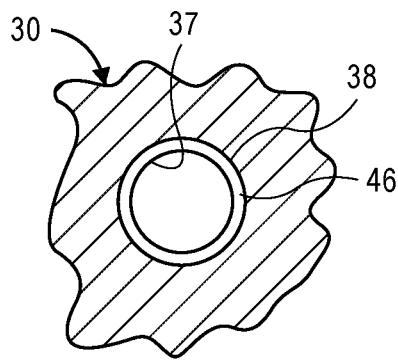
FIG. 10A is a cross-sectional view of a first mounting portion of the energy absorption member illustrated in FIG. 2A, showing an insert supported partially in a first mounting aperture of the first mounting portion.
Figure 10C:
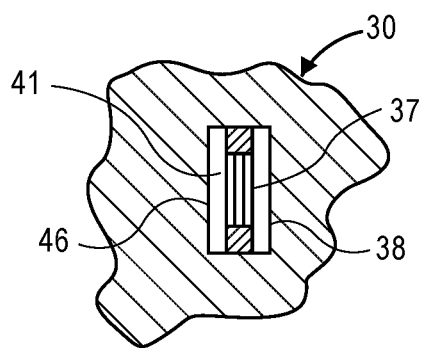
FIG. 10C is another cross-sectional view of a first mounting portion of the energy absorption member illustrated in FIG. 10A, showing the insert configured as a threaded nut.
Figure 10B:
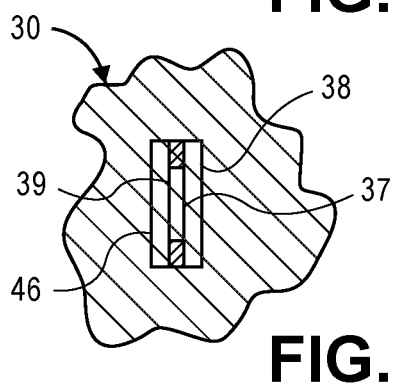
FIG. 10B is another cross-sectional view of a first mounting portion of the energy absorption member illustrated in FIG. 10A, showing the insert configured as a washer.
Figure 11A:
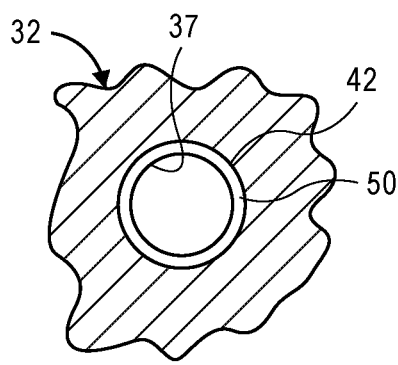
FIG. 11A is a cross-sectional view of a second mounting portion of the energy absorption member illustrated in FIG. 2A, showing an insert supported partially in a second mounting aperture of the first mounting portion.
Figure 11C:
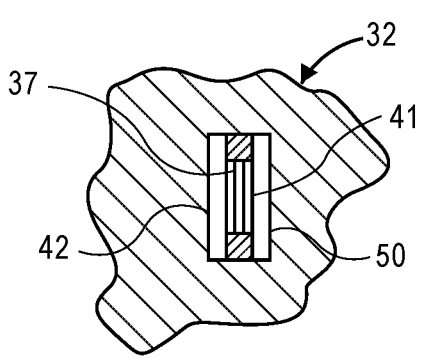
FIG. 11C is another cross-sectional view of a first mounting portion of the energy absorption member illustrated in FIG. 11A, showing the insert configured as a threaded nut.
Figure 11B:
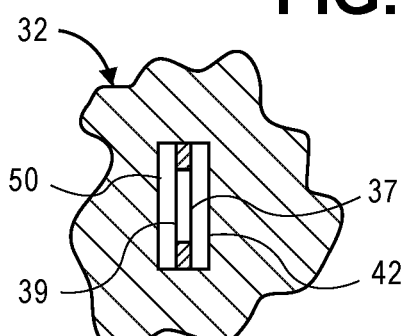
FIG. 11B is another cross-sectional view of a first mounting portion of the energy absorption member illustrated in FIG. 11A, showing the insert configured as a washer.

Referring to FIGS. 2A-2C and 6A-9B, the crushable body 34 can include a plurality of ribs 60. The hub 54 and the ribs 60 cooperate to define the honeycomb structure 31 that provides improved stability of the energy absorption member 28 along the lateral direction A, with respect to conventional energy absorption members, in response to a collision impact that is oblique with respect to the longitudinal direction L. As illustrated in FIGS. 2A-2C and 6A-8C, the ribs 60 can extend out from the hub 54. Alternatively, as illustrated in FIGS. 9A-9B, the ribs 60 can intersect so as to define the hub 54 at an intersection 61 of at least some up to all of the ribs 60. Thus, the inner wall 64 of the crushable body 34 as illustrated in FIGS. 9A-9B can be defined by the intersection 61 of the ribs 60. The intersection 61 can lie on the central axis 35 of the crushable body 34. Alternatively, the intersection can be offset with respect to the central axis 35. As illustrated in FIGS. 2A-2C and 6A-8B, the ribs 60 can extend radially outward from a respective one of the apices 62. Alternatively, as illustrated in FIG. 8C, the ribs 60 can extend out from the round, for instance circular, hub 54. Referring again to FIGS. 2A-2C and 6A-9B generally, respective ones of the voids 44 can be defined between circumferentially adjacent ones of the ribs 60. The hub 54 can define a radially inner end of the voids 44. The ribs 60 can be equidistantly spaced from each other circumferentially about the hub 54. Alternatively, the ribs can be variable spaced from each other circumferentially about the hub 54. The ribs 60 and the hub 54 can be coplanar with each other at one or both of the first end 34a and the second end 34b along a respective plane that is normal to the longitudinal direction L.

Referring to FIGS. 2A-2C and 6A-9B, the crushable body 34 can be geometrically configured such that it has a strength or stiffness, or both, that is less at the first end 34a than at the second end 34b. Accordingly, the first end 34a is configured to collapse more easily in response to a collision impact than the second end 34b. Thus, the initial failure of the crushable body 34 in response to the collision impact can be directed to the first end 34a. In one example, illustrated in FIG. 2C but also applicable to FIGS. 6A-9B, at least one or more of the ribs 60 up to all of the ribs 60 can have a first cross-sectional area A1 and a second cross-sectional area A2 that is less than the first cross-sectional area. The first cross-sectional area A1 can be disposed between the second end 34b and the first cross-sectional area A1. Each of the ribs 60 at the first cross-sectional area can have a thickness that is greater than the thickness of ribs 60 at the second cross-sectional area. The first and second cross-sectional areas A1 and A2, including the respective thicknesses, of the ribs 60 can be measured along the plane that is oriented normal to the longitudinal direction L. In one example, at least one or more of the ribs 60 up to all of the ribs 60 can be tapered in a direction from the second end 34b toward the first end 34a. For instance, the at least one or more of the ribs 60 up to all of the ribs 60 can be tapered from the second end 34b to the first end 34a. Similarly, the at least one inner wall 64 can have a respective first cross-sectional area and a respective second cross-sectional area that is less than the respective first cross-sectional area. The respective first cross-sectional area can be disposed between the second end 34b and the first cross-sectional area. Thus, the at least one inner wall 64 can be tapered in a direction from the second end 34b toward the first end 34a. For instance, the at least one inner wall 64 can be tapered from the second end 34b to the first end 34a.

The crushable body 34 can define at least one outer wall 70 that is disposed radially outward with respect to the inner wall 64. The at least one outer wall 70 can extend between the first end 34a and the second end 34b. For instance, the at least one outer wall 70 can extend from the first end 34a to the second end 34b. The at least one outer wall 70 can define a corresponding at least one inner surface 72. The at least one inner surface 72, and thus the outer wall 70, can partially define the voids 44. For instance, the at least one inner surface 72 can define a radially outer boundary, or a radially outer end, of the voids 44. The ribs 60 can extend radially outward from the hub 54 to the at least one outer wall 70. Thus, the voids 44 can be defined by at least one outer wall 70, the hub 54, and the ribs 60 along a plane that is oriented normal to the longitudinal direction L. In particular, the voids 44 can be enclosed by the at least one outer wall 70, the hub 54, and adjacent ones of the ribs 60 along the plane.

The at least one outer wall 70 can similarly define at least one outer surface 74 that is opposite the at least one inner surface 72. The at least one outer surface 74 can be spaced radially outward from the at least one inner surface 72. The at least one outer surface 74 can be substantially parallel to the at least one inner surface 72. The at least one outer surface 74 can be substantially planar at the first end 34a. The at least one outer surface 74 can be substantially planar at the second end 34b. The at least one outer surface 74 can be substantially planar from the first end 34a to the second end 34b. As illustrated in FIGS. 7A-9B, at least a portion of the outer surfaces 74 of the outer walls 70 can define at least a portion of an external surface 76 of the crushable body 34. The external surface 76 of the crushable body 34 can be configured such that that the energy absorption member 28 does not define any other surface that is disposed radially outward of the external surface 76, and aligned with both the external surface 76 and the central axis 35 along a straight line. For instance the crushable body 34 can include first and second external side walls 78 that are spaced from each other along the lateral direction A, and external upper and lower walls 80 and 82, respectively, that are spaced from each other along the transverse direction T. The side walls 78, the upper wall 80, and the lower wall 82, can each define a respective external surface 76 of the crushable body 34. It should be appreciated, as illustrated in FIGS. 2A-2C and 6A-9B, that one or more up to all of the side walls 78, the upper wall 80, and the lower wall 82, can be disposed radially outward with respect to one or more up to all of the at least one outer wall 70. Thus, the external surface 76 of the crushable body 34 can at least partially surround the at least one outer wall 70 along a plane that is oriented normal to the longitudinal direction L. For instance, as illustrated in FIGS. 2A-2C and 6A-6D, the external surface 76 of the crushable body 34 can surround a substantial entirety of the at least one outer wall 70 along a plane that is oriented normal to the longitudinal direction L, from the first end 34a to the second end 34b.

As described above, the crushable body 34 can be geometrically configured such that it has a strength or stiffness, or both, that is less at the first end 34a than at the second end 34b. Accordingly, the first end 34a is configured to collapse more easily in response to a collision impact than the second end 34b. Thus, the initial failure of the crushable body 34 in response to the collision impact can be directed to the first end 34a. In one example, the at least one outer wall 70 can have a first cross-sectional area and a second cross-sectional area that is less than the first cross-sectional area along a plane that is oriented normal to the longitudinal direction L. The first cross-sectional area can be disposed between the second end 34b and the second cross-sectional area. Thus, the at least one outer wall 70 tapered in a direction from the second end 34b toward the first end 34a. For instance, the at least one outer wall 70 can be tapered from the second end 34b to the first end 34a. It is recognized that the increased strength of the crushable body 34 in a direction from the first end 34a toward the second end 34b can alternatively or additionally be achieved by adjusting the geometry of at least one of the ribs 60, the inner wall 64, and the outer wall 70. For instance, the geometry can be stronger at a location proximate to the second end 34b, with respect to the geometry at a location proximate to the first end 34a.

The at least one outer wall 70 can be configured as a rounded, such as a circular, wall. Accordingly, the at least one inner surface 72 and the at least one outer surface 74 can define respective rounded, such as circular, surfaces. Alternatively, as illustrated, the at least one outer wall 70 can be configured as a plurality of outer walls 70. The outer walls 70 can define a respective plurality of inner surfaces 72 and outer surfaces 74 opposite the inner surfaces. The inner surfaces 72, and thus the outer walls 70, can combine to partially define the voids 44. For instance, each of the inner surfaces 72 can define a radially outer boundary, or a radially outer end, of a respective at least one of the voids 44. In one example, each of the inner surfaces 72 can define a radially outer boundary, or a radially outer end, of a respective one of the voids 44. The ribs 60 can extend radially outward from the hub 54 to a respective at least one of the outer walls 70. For instance, the ribs 60 can extend radially outward from the hub 54 to a respective one of the outer walls 70. Alternatively, the ribs 60 can extend radially outward from the hub 54 to an intersection of adjacent ones of the outer walls 70. Thus, each of the voids 44 can be defined by at least one of the outer walls 70, the hub 54, and the ribs 60 along a plane that is oriented normal to the longitudinal direction L. For instance, the voids 44 can be enclosed by the at least one of the outer walls 70, the hub 54, and adjacent ones of the ribs 60 along the plane.

The outer surfaces 74 can be parallel with the respective inner surfaces 72, such that the geometry or shape defined by the inner surfaces 72 can likewise define the geometry or shape of the outer surfaces 74. Similarly, the geometry or shape defined by the outer surfaces 74 can likewise define the geometry or shape of the inner surfaces 72. The inner surfaces 72 can combine to define a polygonal shape along a plane that is oriented normal to the longitudinal direction. The polygonal shape can define a regular polygonal shape. Alternatively, the polygonal shape can be an irregular polygonal shape. Whether the polygonal shape is regular or irregular, the polygonal shape can be symmetrical about a central axis of the polygonal shape along the plane. The central axis of the polygonal shape can, for instance, be oriented in the transverse direction along the plane. Alternatively, the polygonal shape can be asymmetrical about the central axis of the polygonal shape along the plane.

Referring to FIGS. 2A-2B, FIGS. 6A-6D, and FIGS. 8A-8C, the polygonal shape defined by the inner surfaces 72, in one example can, can be a quadrilateral. For instance, the quadrilateral can be a rectangle having two pairs of opposed parallel surfaces. The rectangle can be configured as a square, wherein each of the two pairs of opposed surfaces have the same length. Alternatively, one of the opposed pair of surfaces can have a length different than the other of the opposed pair of surfaces. The rectangle defines first and second axis that bisect respective ones of the opposed surfaces of the rectangle. As illustrated in FIGS. 2A-2B and 6A-6D, the first axis can extend along the lateral direction A, and the second axis can extend along the transverse directions T. Alternatively, as illustrated in FIGS. 8A-8C, the first and second axes can be oblique to each of the lateral direction A and the transverse direction T. It should be appreciated, of course, that the polygonal shape can define any number of sides as desired. For instance, as illustrated in FIGS. 7A-7C and 9A-9B, the polygonal shape can define a hexagon. The polygonal shape can be a regular or irregular polygonal shape as desired.

Figure 2A:
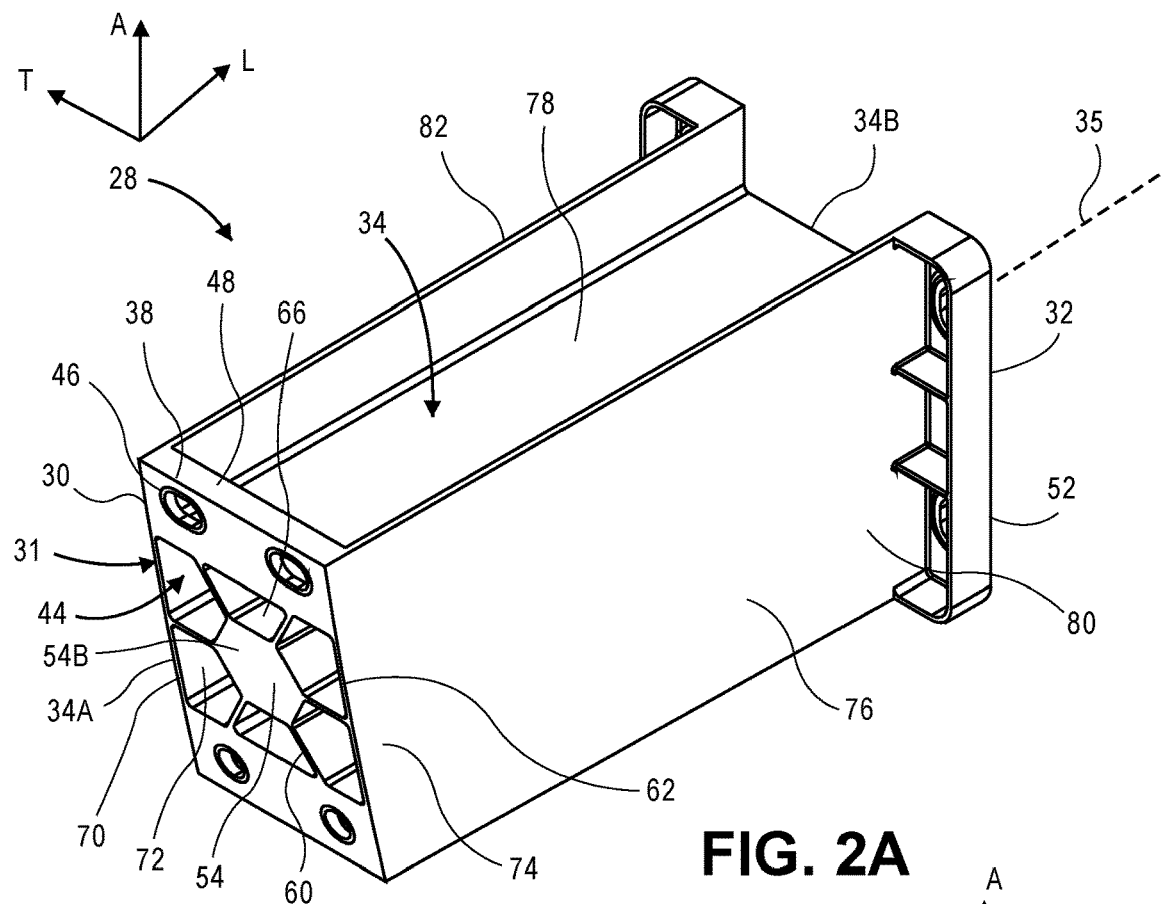
FIG. 2A is a front perspective view of an energy absorption member of the automobile bumper assembly as illustrated in FIG. 1, constructed in accordance with one aspect.
Figure 2B:
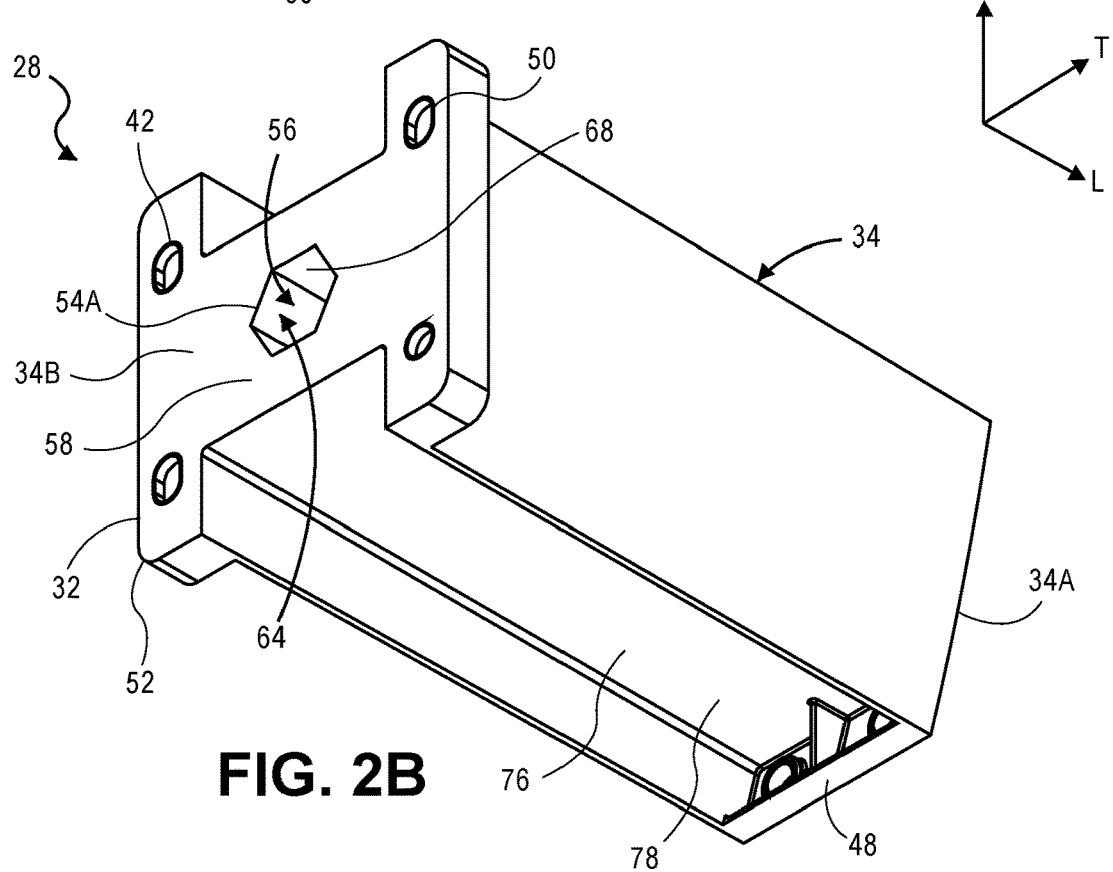
FIG. 2B is a rear perspective view of the energy absorption member illustrated in FIG. 2A.
Figure 2C:
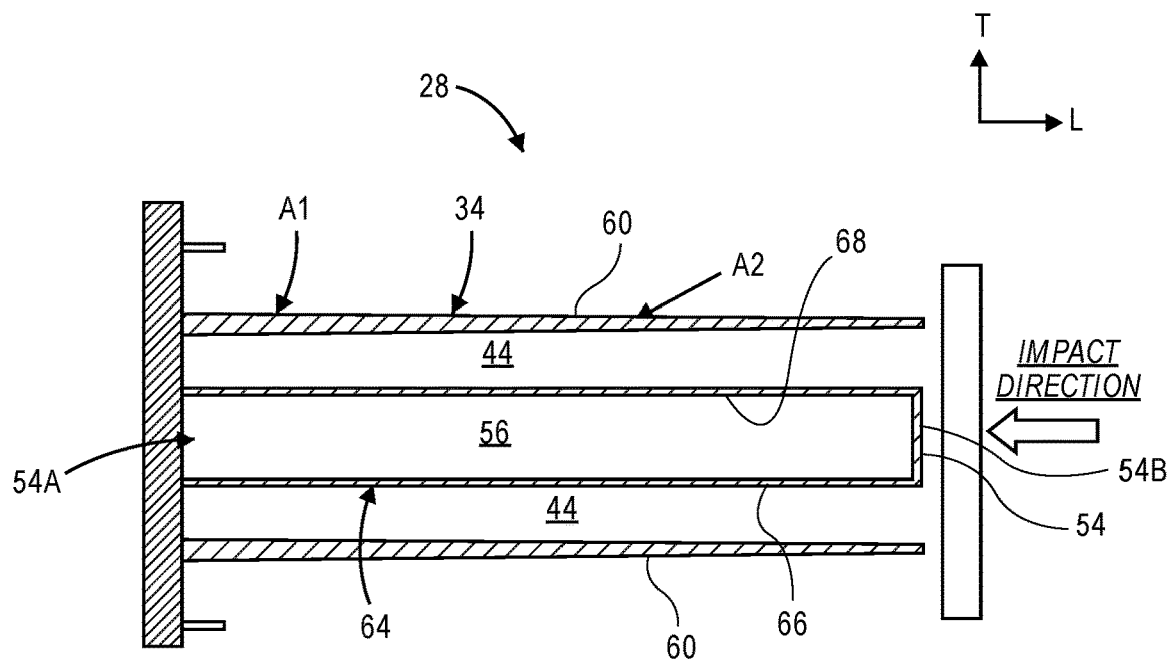
FIG. 2C is a schematic sectional elevation view of the energy absorption member illustrated in FIG. 2A, shown positioned to undergo a collision impact.
Figure 3A:
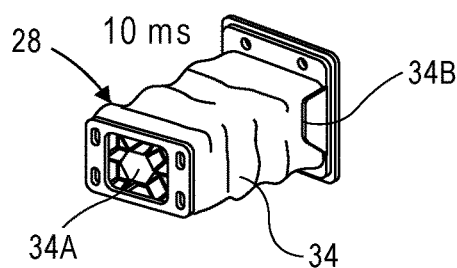
FIG. 3A is a front perspective view of the energy absorption member illustrated in FIG. 2A, shown at a first time duration an impact to the energy absorption member.
Figure 3B:
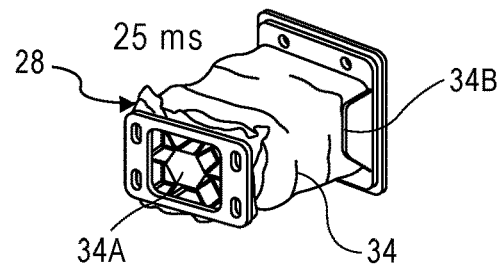
FIG. 3B is a front perspective of the energy absorption member illustrated in FIG. 3A, shown at a second time during the impact, wherein the second time is after the first time.
Figure 3C:
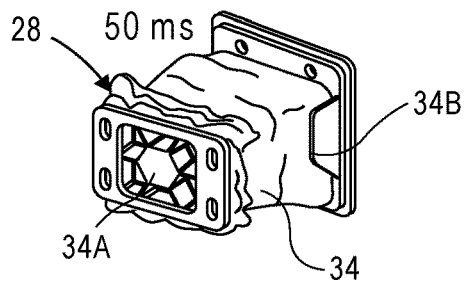
FIG. 3C is a front perspective of the energy absorption member illustrated in FIG. 3B, shown at a third time during the impact, wherein the third time is after the second time.
Figure 3D:
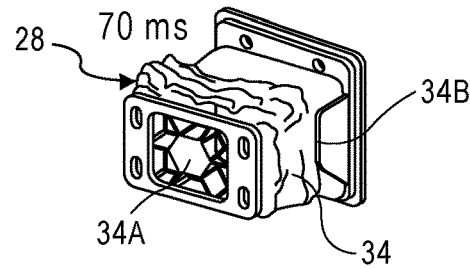
FIG. 3D is a front perspective of the energy absorption member illustrated in FIG. 3C, shown at a fourth time during the impact, wherein the fourth time is after the third time.

Referring to FIGS. 3A-3D, the energy absorption member 28 illustrated in FIGS. 2A-2C is subjected to an impact energy of approximately 17 kilojoules from an impactor at a speed of 15 kilometers/hour (9.3 miles/hour) along the longitudinal direction. Thus, the impact energy was directed to the first end 34a of the crushable body 34 along the longitudinal direction toward the second end 34b. The energy absorption member 28 is shown at different times throughout the impact. FIG. 3A shows the energy absorption member 28 after 10 milliseconds, FIG. 3B shows the energy absorption member 28 after 25 milliseconds, FIG. 3C shows the energy absorption member after 50 milliseconds, and FIG. 3D shows the energy absorption member after 70 milliseconds. It was determined that the maximum force on the impactor was less than 110 kilonewtons.

Figure 4A:
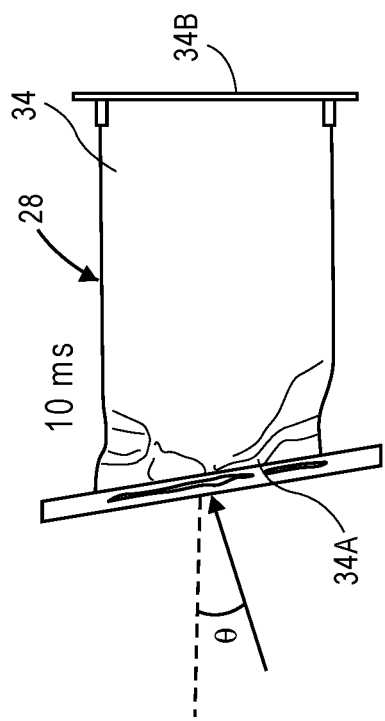
FIG. 4A is a side elevation view of the energy absorption member illustrated in FIG. 2A, shown at a first time during an impact to the energy absorption member at an oblique angle.
Figure 4A:
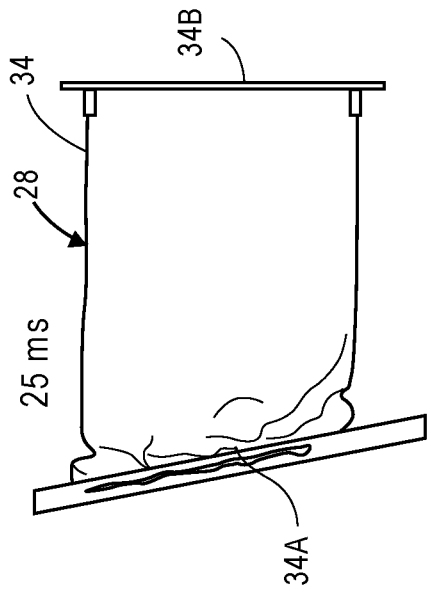
Figure 4C:
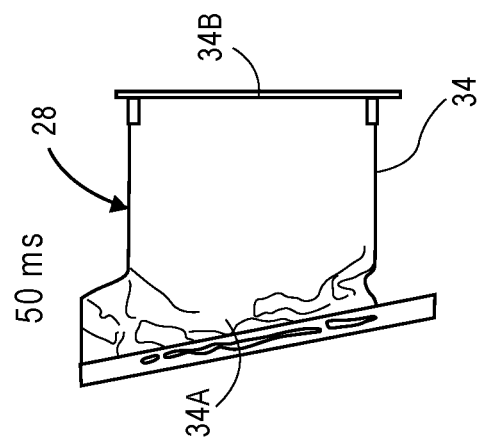
FIG. 4C is a side elevation view of the energy absorption member illustrated in FIG. 4B, shown at a third time during the impact, wherein the third time is after the second time.
Figure 4D:
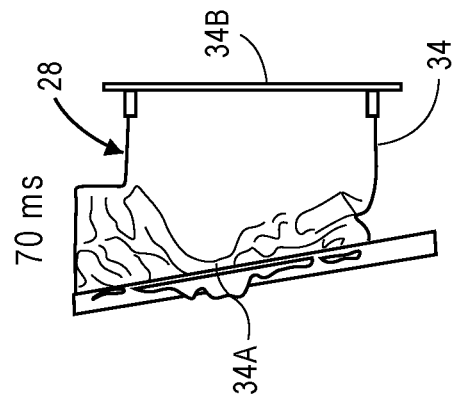
FIG. 4D is a side elevation view of the energy absorption member illustrated in FIG. 4C, shown at a fourth time during the impact, wherein the fourth time is after the third time.

Referring to FIGS. 4A-4D, the energy absorption member 28 illustrated in FIGS. 2A-2C is subjected to an impact energy of approximately 17 kilojoules from an impactor at a speed of 15 kilometers/hour (9.3 miles/hour) along a direction that is oblique to the longitudinal direction at an angle θ of 10 degrees. Thus, the impact energy was directed to the first end 34a of the crushable body 34 along the oblique direction. The energy absorption member 28 is shown at different times throughout the impact. FIG. 4A shows the energy absorption member 28 after 10 milliseconds, FIG. 4B shows the energy absorption member 28 after 25 milliseconds, FIG. 4C shows the energy absorption member after 50 milliseconds, and FIG. 4D shows the energy absorption member after 70 milliseconds. FIGS. 4A-4D demonstrate the lateral stability of the energy absorption member 28 during the oblique impact force.

Figure 5A:
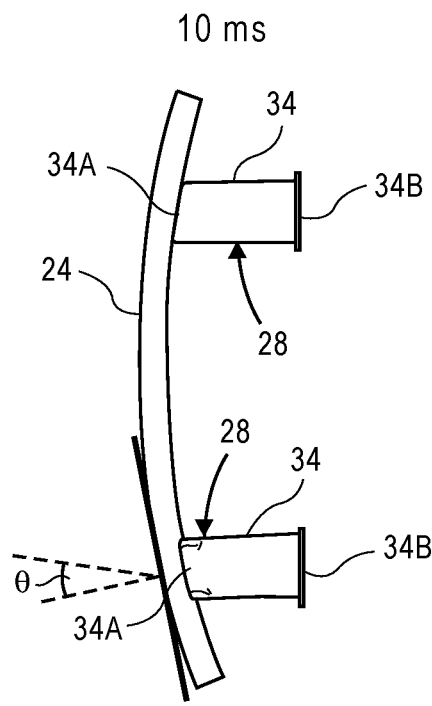
FIG. 5A is a top view of a bumper assembly including pair of energy absorption members illustrated in FIG. 2A mounted to a bumper at a first time during an impact to the bumper at an oblique angle.
Figure 5B:
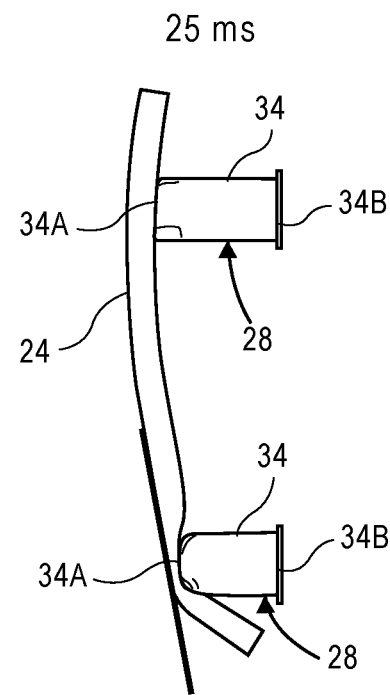
FIG. 5B is a top view of the bumper assembly in FIG. 5A, shown at a second time during the impact, wherein the second time is after the first time.
Figure 5C:
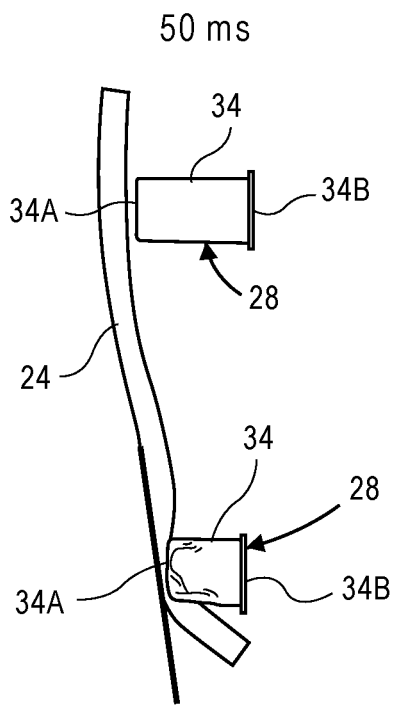
FIG. 5C is a top view of the bumper assembly in FIG. 5B, shown at a third time during the impact, wherein the third time is after the second time.
Figure 5D:
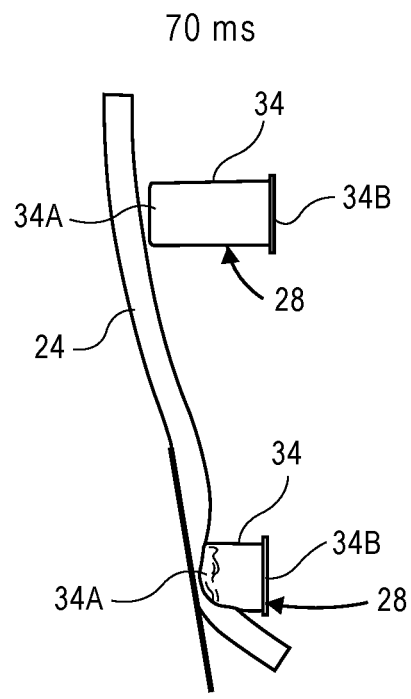
FIG. 5D is a top view of the bumper assembly in FIG. 5C, shown at a fourth time during the impact, wherein the fourth time is after the third time.

FIGS. 5A-5D show a pair of the energy absorption members 28 as illustrated in FIGS. 2A-2C attached to a bumper 24. The bumper 24 was subjected to an impact energy of approximately 17 kilojoules from an impactor at a speed of 15 kilometers/hour (9.3 miles/hour) along a direction that is oblique to the longitudinal direction at an angle θ of 10 degrees. Thus, the first ends 34a of the crushable bodies 34 experienced an impact energy along the oblique direction. The energy absorption members 28 are shown at different times throughout the impact. FIG. 5A shows the energy absorption members 28 after 10 milliseconds, FIG. 5B shows the energy absorption members 28 after 25 milliseconds, FIG. 5C shows the energy absorption members after 50 milliseconds, and FIG. 5D shows the energy absorption members after 70 milliseconds. FIGS. 5A-5D demonstrate the lateral stability of the energy absorption members 28 as mounted between the bumper 24 and the automobile rail 26 during the oblique impact force.

It should be appreciated that the present disclosure can include any one up to all of the following examples:

Example 1

An energy absorption member configured to be coupled between an automobile rail and a bumper, the energy absorption member comprising:
  a plastic crushable body defining a first end and a second end opposite the first end along a length of the crushable body;
  a plastic first mounting portion disposed proximate to the first end and monolithic with the plastic crushable body, the first mounting portion defining at least one first attachment member configured to attach to the bumper; and
  a plastic second mounting portion disposed proximate to the second end and monolithic with the plastic crushable body, the second mounting portion defining at least one second attachment member configured to attach to the automobile rail,
  wherein the energy absorption member defines a plurality of voids that each extend along at least a portion of the length of the crushable body.

Example 2

The energy absorption member as recited in example 1, wherein the crushable body defines a hub, and the voids are disposed radially outward with respect to the hub.

Example 3

The energy absorption member as recited in any one of examples 1 to 2, wherein at least some of up to all of the plurality of voids extends from one of the first end second ends toward the other of the first and second ends without extending through the other of the first and second ends in their respective entireties.

Example 4

The energy absorption member as recited in example 3, wherein each of the plurality of voids extends along a majority of the length of the crushable body.

Example 5

The energy absorption member as recited in example 4, wherein each of the plurality of voids extends along 90% of the length of the crushable body.

Example 6

The energy absorption member as recited in any one of examples 3 to 5, wherein each of the plurality of voids extends from the first end toward the second end, and terminates in the crushable body without extending through the second end.

Example 7

The energy absorption member as recited in any one of examples 3 to 5, wherein each of the plurality of voids extends from the second end toward the first end, and terminates in the crushable body without extending through the first end.

Example 8

The energy absorption member as recited in any one of examples 3 to 5, wherein the crushable body comprises an end plate at the other of the first and second ends, and the end plate closes at least a portion of the at least some up to all of the plurality of voids.

Example 9

The energy absorption member as recited in example 8, wherein the crushable body defines at least one hole that extends through the end plate and into a respective one of the at least some up to all of the voids.

Example 10

The energy absorption member as recited in example 8, wherein the end plate closes an entirety of the at least some up to all of the plurality of voids at the other of the first and second ends.

Example 11

The energy absorption member as recited in any one of examples 8 to 10, wherein the hub defines a void that extends from one of the first and second ends toward the other of the first and second ends.

Example 12

The energy absorption member as recited in example 11, wherein the hub is open at one of the first and second ends, and at least partially closed at the other of the first and second ends.

Example 13

The energy absorption member as recited in example 12, wherein the hub defines a void that extends from the one of the first and second ends at least halfway toward the other of the first and second ends.

Example 14

The energy absorption member as recited in example 13, wherein the hub extends at least 90% of a distance from the one of the first and second ends to the other of the first and second ends.

Example 15

The energy absorption member as recited in any one of examples 11 to 14, wherein the hub is at least partially closed at the first end and open at the second end.

Example 16

The energy absorption member as recited in any one of examples 11 to 14, wherein the hub is open at the first end and at least partially closed at the second end.

Example 17

The energy absorption member as recited in any one of examples 11 to 14, wherein the void of the hub extends through both the first end and the second end.

Example 18

The energy absorption member as recited in any one of examples 8 to 14, wherein the void of the hub terminates at one of the first and second ends, and the end plate is disposed at the other of the first and second ends.

Example 19

The energy absorption member as recited in any one of examples 8 to 14, wherein the end plate closes both at least a portion of at least some up to all of the voids, and also closes the void of the hub.

Example 20

The energy absorption member as recited in any one of examples 3 to 7, wherein the hub defines a void that extends from one of the first and second ends toward the other of the first and second ends.

Example 21

The energy absorption member as recited in example 20, wherein the hub is open at one of the first and second ends, and closed at the other of the first and second ends.

Example 22

The energy absorption member as recited in example 21, wherein the hub defines a void that extends from the one of the first and second ends at least halfway toward the other of the first and second ends.

Example 23

The energy absorption member as recited in example 22, wherein the hub extends at least 90% of a distance from the one of the first and second ends to the other of the first and second ends.

Example 24

The energy absorption member as recited in any one of examples 20 to 23, wherein the hub is at least partially closed at the first end and open at the second end.

Example 25

The energy absorption member as recited in any one of examples 20 to 23, wherein the hub is open at the first end and at least partially closed at the second end.

Example 26

The energy absorption member as recited in example 2, wherein the plurality of voids extends through the crushable body from the first end to the second end.

Example 27

The energy absorption member as recited in example 26, wherein the hub defines a void that extends from one of the first and second ends toward the other of the first and second ends.

Example 28

The energy absorption member as recited in example 27, wherein the hub is open at one of the first and second ends, and closed at the other of the first and second ends.

Example 29

The energy absorption member as recited in example 28, wherein the hub defines a void that extends from the one of the first and second ends at least halfway toward the other of the first and second ends.

Example 30

The energy absorption member as recited in example 29, wherein the hub extends at least 90% of a distance from the one of the first and second ends to the other of the first and second ends.

Example 31

The energy absorption member as recited in any one of examples 27 to 30, wherein the hub is at least partially closed at the first end and open at the second end.

Example 32

The energy absorption member as recited in any one of examples 27 to 30, wherein the hub is open at the first end and at least partially closed at the second end.

Example 33

The energy absorption member as recited in example 27, wherein the void of the hub extends entirely through the crushable body from the first end to the second end.

Example 34

The energy absorption member as recited in any one of examples 2 to 33, wherein the crushable body further comprises a plurality of ribs that extend out from the hub, wherein respective ones of the voids are defined between circumferentially adjacent ones of the ribs.

Example 35

The energy absorption member as recited in example 34, wherein at least one of the ribs has a first cross-sectional area and a second cross-sectional area that is less than the first cross-sectional area, and the first cross-sectional area is disposed between the second end and the first cross-sectional area.

Example 36

The energy absorption member as recited in any one of examples 34 to 35, wherein at least one of the ribs is tapered in a direction from the second end toward the first end.

Example 37

The energy absorption member as recited in example 36, wherein at least one of ribs is tapered from the second end to the first end.

Example 38

The energy absorption member as recited in any one of examples 35 to 37, wherein the at least one of the ribs comprises a plurality of the ribs.

Example 39

The energy absorption member as recited in example 38, wherein the at least one of the ribs comprises all of the ribs.

Example 40

The energy absorption member as recited in any one of examples 34 to 39, wherein the ribs each extend from a respective apex defined by the hub along a plane that is normal to a longitudinal direction, and the first and second ends are spaced apart in the longitudinal direction.

Example 41

The energy absorption member as recited in any one of examples 34 to 40, wherein the crushable body further comprises at least one outer wall that define respective inner surfaces that, in turn, define radially outer ends of the voids.

Example 42

The energy absorption member as recited in example 41, wherein the at least one outer wall comprises a plurality of outer walls.

Example 43

The energy absorption member as recited in any one of examples 41 to 42, wherein the ribs extend radially outward from the hub to the at least one outer wall.

Example 44

The energy absorption member as recited in any one of examples 41 to 43, wherein the first and second ends are spaced from each other along a longitudinal direction, and the voids are defined by the outer walls, the hub, and the ribs along a plane that is oriented normal to the longitudinal direction.

Example 45

The energy absorption member as recited in example 44, wherein the voids are enclosed by the outer walls, the hub, and the ribs along the plane.

Example 46

The energy absorption member as recited in any one of examples 41 to 45, wherein at least one of the outer walls is tapered in a direction from the second end toward the first end.

Example 47

The energy absorption member as recited in example 46, wherein the at least one of the outer walls is tapered from the second end to the first end.

Example 48

The energy absorption member as recited in any one of examples 46 to 47, wherein the at least one of the outer walls comprises a plurality of the outer walls.

Example 49

The energy absorption member as recited in example 48, wherein the at least one of the outer walls and the ribs comprises all of the outer walls.

Example 50

The energy absorption member as recited in any one of examples 41 to 49, wherein the inner surfaces combine to define a polygonal shape along a plane that is oriented normal to the longitudinal direction.

Example 51

The energy absorption member as recited in any one of examples 41 to 49, wherein the first and second ends are spaced from each other along a longitudinal direction, the crushable body defines first and second side walls spaced from each other along a lateral direction perpendicular to the longitudinal direction, and an upper wall and a lower wall spaced from the upper wall along a transverse direction perpendicular to each of the longitudinal direction and the lateral direction, and the polygonal shape is symmetrical about a central axis of the polygonal shape, the central axis oriented in the transverse direction.

Example 52

The energy absorption member as recited in any one of examples 50 to 51, wherein the polygonal shape is a regular polygonal shape.

Example 53

The energy absorption member as recited in any one of examples 50 to 52, wherein the polygonal shape comprises a hexagon.

Example 54

The energy absorption member as recited in any one of examples 50 to 52, wherein the polygonal shape comprises a rectangle.

Example 55

The energy absorption member as recited in example 54, wherein the rectangle comprises a square.

Example 56

The energy absorption member as recited in any one of examples 54 to 55, wherein the first and second ends are spaced from each other along a longitudinal direction, the crushable body defines first and second side walls spaced from each other along a lateral direction perpendicular to the longitudinal direction, and an upper wall and a lower wall spaced from the upper wall along a transverse direction perpendicular to each of the longitudinal direction and the lateral direction.

Example 57

The energy absorption member as recited in example 56, wherein the rectangle defines respective first and second axes that bisect opposed surfaces of the rectangle, the first axis extends along the lateral direction, and the second axis extends along the transverse directions.

Example 58

The energy absorption member as recited in example 56, wherein the rectangle defines respective first and second axes that bisect opposed surfaces of the rectangle, and each of the first and second axis are oblique with respect to each of the lateral and transverse directions.

Example 59

The energy absorption member as recited in any one of examples 50 to 51, wherein the polygonal shape is an irregular polygonal shape.

Example 60

The energy absorption member as recited in any one of examples 41 to 59, wherein the outer walls define respective outer surfaces opposite the inner surfaces, and the outer surface of at least one up to all of the outer walls is substantially parallel to the respective inner surface.

Example 61

The energy absorption member as recited in any one of examples 41 to 59, wherein the outer walls define respective outer surfaces opposite the inner surfaces, and the outer surface of at least one up to all of the outer walls is substantially planar at the first end.

Example 62

The energy absorption member as recited in any one of examples 41 to 59, wherein the outer walls define respective outer surfaces opposite the inner surfaces, and the outer surface of at least one up to all of the outer walls is substantially planar at the second end.

Example 63

The energy absorption member as recited in any one of examples 41 to 59, wherein the outer walls define respective outer surfaces opposite the inner surfaces, and the outer surface of at least one up to all of the outer walls is substantially planar from the first end to the second end.

Example 64

The energy absorption member as recited in any one of examples 60 to 63, wherein the outer surface of at least one of the outer walls defines at least a portion of an external surface of the crushable body.

Example 65

The energy absorption member as recited in any one of examples 2 to 64, wherein the crushable body comprises at least one inner wall that defines the hub.

Example 66

The energy absorption member as recited in example 65, wherein the at least one inner wall comprises an outer surface that defines an inner end of the voids.

Example 67

The energy absorption member as recited in any one of examples 65 to 66, wherein the first and second ends are spaced from each other along a longitudinal direction, and the at least one inner wall comprises a plurality of inner walls.

Example 68

The energy absorption member as recited in example 67, wherein the plurality of inner walls combine to define a polygonal shape along a plane that is oriented normal to the longitudinal direction.

Example 69

The energy absorption member as recited in example 68, wherein the polygonal shape is a regular polygonal shape.

Example 70

The energy absorption member as recited in any one of examples 68 to 69, wherein the polygonal shape comprises a hexagon.

Example 71

The energy absorption member as recited in any one of examples 65 to 66, wherein the at least one inner wall defines a rounded shape along a plane that is oriented normal to the longitudinal direction.

Example 72

The energy absorption member as recited in example 71, wherein the rounded shape is circular.

Example 73

The energy absorption member as recited in any one of examples 65 to 72, wherein the at least one inner wall is annular so as to define the void of the hub.

Example 74

The energy absorption member as recited in any one of examples 65 to 73, wherein the at least one inner wall defines a respective at least one outer surface that partially defines a respective at least one of the voids.

Example 75

The energy absorption member as recited in example 74, wherein the at least one inner wall defines a respective at least one inner surface opposite the respective at least one outer surface so as to define the void of the hub.

Example 76

The energy absorption member as recited in example 75, wherein the at least one inner surface is parallel to the at least one outer surface.

Example 77

The energy absorption member as recited in any one of examples 1 to 76, wherein the at least one first attachment member comprises at least one first mounting aperture.

Example 78

The energy absorption member as recited in example 77, wherein the at least one first attachment member comprises a plurality of first mounting apertures.

Example 79

The energy absorption member as recited in any one of examples 77 to 78, further comprising an insert that is at least partially disposed in each at least one first mounting aperture.

Example 80

The energy absorption member as recited in example 79, wherein the insert comprises one of a washer and a threaded nut.

Example 81

The energy absorption member as recited in any one of examples 79 to 80, wherein the insert is metallic.

Example 82

The energy absorption member as recited in any one of examples 79 to 81, wherein the insert is localized at the respective first mounting aperture.

Example 83

The energy absorption member as recited in any one of examples 77 to 82, wherein the first mounting portion defines a mounting plate disposed proximate to the first end of the crushable body, and the at least one mounting aperture extends at least into the mounting plate along a direction from the first end toward the second end.

Example 84

The energy absorption member as recited in example 83, wherein the at least one mounting aperture extends through the mounting plate.

Example 85

The energy absorption member as recited in example 84, wherein the mounting plate is disposed radially outward with respect to the plurality of voids.

Example 86

The energy absorption member as recited in any one of examples 77 to 85, wherein the first mounting portion is configured to attach to the bumper.

Example 87

The energy absorption member as recited in any one of examples 1 to 86, wherein the at least one second attachment member comprises at least one second mounting aperture.

Example 88

The energy absorption member as recited in example 87, wherein the at least one second attachment member comprises a plurality of second mounting apertures.

Example 89

The energy absorption member as recited in any one of examples 86 to 88, further comprising an insert that is at least partially disposed in each at least one second mounting aperture.

Example 90

The energy absorption member as recited in example 81, wherein the insert comprises one of a washer and a threaded nut.

Example 91

The energy absorption member as recited in any one of examples 88 to 90, wherein the insert is metallic.

Example 92

The energy absorption member as recited in any one of examples 88 to 91, wherein the insert is localized at the respective second mounting aperture.

Example 93

The energy absorption member as recited in any one of examples 77 to 83, wherein the second mounting portion defines at least one mounting flange that extends out from the crushable body, and the at least one second mounting aperture extends at least into the mounting flange along a direction from the second end toward the first end.

Example 94

The energy absorption member as recited in example 93, wherein the second at least one mounting aperture extends through the mounting flange.

Example 95

The energy absorption member as recited in example 84, wherein the at least one mounting flange comprises a pair of mounting flanges, and the at least one second mounting aperture includes a first pair of mounting apertures that extends through a first one of the pair of mounting flanges, and a second pair of mounting apertures that extends through a second one of the pair of mounting flanges.

Example 96

The energy absorption member as recited in any one of examples 87 to 95, wherein the second mounting portion is configured to attach to the automobile rail.

Example 97

The energy absorption member as recited in any one of examples 1 to 96, wherein the first and second ends are spaced from each other along a longitudinal direction, the crushable body defines a honeycomb structure along a plane that is normal to the longitudinal direction, and the honeycomb structure includes at least one or both of the hub and the plurality of voids.

Example 98

The energy absorption member as recited in any one of examples 1 to 97, wherein the voids are continuous along an entirety of their respective lengths.

Example 99

The energy absorption member as recited in any one of examples 1 to 97, wherein the voids are discontinuous along their respective lengths.

Example 100

A bumper assembly comprising:
the bumper as recited in example 1; and
the energy absorption member as recited in any one of examples 1 to 99, wherein the first end is mounted to the bumper.

Example 101

The bumper assembly as recited in example 100, further comprising at least one first fastener that attaches the first mounting portion to the bumper.

Example 102

The bumper assembly as recited in example 99, wherein the fastener extends through the first mounting portion so as to attach the energy absorption member to the bumper.

Example 103

The bumper assembly as recited in any one of examples 100 to 102, further comprising the automobile rail as recited in example 1, wherein the second end is mounted to the automobile rail.

Example 104

The bumper assembly as recited in example 103, further comprising at least one second fastener that attaches the second mounting portion to the automobile rail.

Example 105

The bumper assembly as recited in example 103, wherein the at least one second fastener extends through the second mounting portion so as to attach the energy absorption member to the automobile rail.

Example 106

The bumper assembly as recited in any one of examples 103 to 105, wherein the automobile rail is a front rail, the first end defines a front end of the crushable body, and the second end defines a rear end of the crushable body.

Example 107

The bumper assembly as recited in any one of examples 103 to 105, wherein the automobile rail is a rear rail, the first end defines a rear end of the crushable body, and the second end defines a front end of the crushable body.

Example 108

A method of fabricating a bumper assembly of an automobile, the method comprising the steps of:
mounting the first end of the crushable body as recited in any one of examples 1 to 99 to the bumper recited in example 1.

Example 109

The method as recited in example 108, wherein the mounting step further comprises the steps of driving a plurality of first fasteners through the at least one first attachment member and at least into the bumper.

Example 110

The method as recited in example 109, wherein the mounting step further comprises abutting a portion of the fastener against the insert recited in any one of examples 79 to 82.

Example 111

The method as recited in example 109, wherein the mounting step further comprises threadedly purchasing a portion of the fastener with the insert recited in any one of examples 79 to 82.

Example 112

The method as recited in any one of examples 108 to 111, further comprising the step of mounting the second end of the crushable body to the automobile rail.

Example 113

The method as recite in example 112, wherein the second mounting step further comprises driving at least one second fastener through the at least one second attachment member and at least into the automobile rail.

Example 114

The method as recited in example 111, wherein the second mounting step further comprises abutting a portion of the at least one fastener against the insert recited in any one of examples 89 to 92.

Example 115

The method as recited in example 114, wherein the mounting step further comprises threadedly purchasing a portion of the second fastener with the insert recited in any one of examples 88 to 90.

The aspects described in connection with the illustrated aspects have been presented by way of illustration, and the present invention is therefore not intended to be limited to the disclosed aspects. Furthermore, the structure and features of each the aspects described above can be applied to the other aspects described herein. Accordingly, those skilled in the art will realize that the invention is intended to encompass all modifications and alternative arrangements included within the spirit and scope of the invention, as set forth by the appended claims.

What is claimed:

1. An energy absorption member configured to be coupled between an automobile rail and a bumper, the energy absorption member comprising:
    a plastic crushable body defining a first end and a second end opposite the first end along a length of the crushable body, wherein the crushable body defines a hub;
    a plastic first mounting portion disposed proximate to the first end and monolithic with the plastic crushable body, the first mounting portion defining at least one first attachment member configured to attach to the bumper; and
    a plastic second mounting portion disposed proximate to the second end and monolithic with the plastic crushable body, the second mounting portion defining at least one second attachment member configured to attach to the automobile rail,
    wherein the energy absorption member defines a plurality of voids that each extend along at least a portion of the length of the crushable body and the plurality of voids are disposed radially outward with respect to the hub,
    wherein the crushable body further comprises a plurality of ribs that extend out from the hub, and
    wherein respective ones of the voids are defined between circumferentially adjacent ones of the ribs.

2. The energy absorption member as recited in claim 1, wherein at least some of up to all of the plurality of voids extend from one of the first and second ends toward the other of the first and second ends without extending through the other of the first and second ends in their respective entireties.

3. The energy absorption member as recited in claim 1, wherein the hub is open at one of the first and second ends, and at least partially closed at the other of the first and second ends.

4. The energy absorption member as recited in claim 1, wherein at least one of the ribs has a first cross-sectional area and a second cross-sectional area that is less than the first cross-sectional area, and the first cross-sectional area is disposed between the second end and the first cross-sectional area.

5. The energy absorption member as recited in claim 1, wherein the plastic crushable body comprises an end plate at the other of the first and second ends, and the end plate closes at least a portion of the at least some up to all of the plurality of voids.

6. The energy absorption member as recited in claim 5, wherein the plastic crushable body defines at least one hole that extends through the end plate and into a respective one of the at least some up to all of the voids.

7. The energy absorption member as recited in claim 5, wherein the end plate closes an entirety of the at least some up to all of the plurality of voids at the other of the first and second ends.

8. The energy absorption member as recited in claim 5 wherein the void of the hub terminates at one of the first and second ends, and the end plate is disposed at the other of the first and second ends.

9. The energy absorption member as recited in claim 8, wherein the end plate closes both at least a portion of at least some up to all of the voids, and also closes the void of the hub.

10. A bumper assembly comprising:
the bumper as recited in claim 1; and
the energy absorption member as recited in claim 1, wherein the first end is mounted to the bumper.

11. The bumper assembly as recited in claim 10, further comprising the automobile rail as recited in claim 1, wherein the second end is mounted to the automobile rail.

12. A method of fabricating a bumper assembly of an automobile, the method comprising the steps of:
mounting the first end of the crushable body as recited in claim 1 to the bumper recited in claim 1.

13. The method as recited in claim 12, further comprising the step of mounting the second end of the crushable body to the automobile rail.

14. The energy absorption member as recited in claim 2, wherein each of the plurality of voids extends along 90% of the length of the crushable body.

15. The bumper assembly as recited in claim 10, further comprising at least one first fastener that attaches the first mounting portion to the bumper.

16. The bumper assembly as recited in claim 15, further comprising at least one second fastener that attaches the second mounting portion to the automobile rail and extends through the second mounting portion so as to attach the energy absorption member to the automobile rail.

17. The method of fabricating a bumper assembly of an automobile as recited in claim 12, wherein the mounting step further comprises the step of driving a plurality of first fasteners through the at least one first attachment member and at least into the bumper.

18. The method of fabricating a bumper assembly of an automobile as recited in claim 12, further comprising the step of mounting the second end of the crushable body to the automobile rail.

* * * * *